(12) United States Patent
Yamaguchi et al.

(10) Patent No.: US 6,742,487 B2
(45) Date of Patent: Jun. 1, 2004

(54) STARTING CONTROL APPARATUS FOR INTERNAL COMBUSTION ENGINE

(75) Inventors: Katsuhiko Yamaguchi, Toyota (JP); Seiji Hino, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 09/839,405

(22) Filed: Apr. 23, 2001

(65) Prior Publication Data

US 2001/0022166 A1 Sep. 20, 2001

Related U.S. Application Data

(62) Division of application No. 09/149,661, filed on Sep. 9, 1998, now Pat. No. 6,247,437.

(30) Foreign Application Priority Data

Sep. 17, 1997 (JP) .............................. 9-272233
Jul. 21, 1998 (JP) ........................... 10-222344

(51) Int. Cl.⁷ ................................. F02N 11/08
(52) U.S. Cl. .................................. 123/179.3
(58) Field of Search .......................... 123/179.3, 179.4, 123/491; 290/38 R, 38 C; 180/65.2; 60/706

(56) References Cited

U.S. PATENT DOCUMENTS

| | | | | |
|---|---|---|---|---|
| 4,490,620 A | * | 12/1984 | Hansen | 123/179.3 |
| 5,497,741 A | | 3/1996 | Tashiro et al. | 123/192.1 |
| 5,789,877 A | * | 8/1998 | Yamada et al. | 318/9 |
| 5,909,720 A | * | 6/1999 | Yamaoka et al. | 123/179.3 |
| 6,247,437 B1 | * | 6/2001 | Yamaguchi et al. | 123/179.3 |

FOREIGN PATENT DOCUMENTS

| | | | | |
|---|---|---|---|---|
| EP | 0 698 522 | | 2/1996 | |
| EP | 0 779 424 | | 6/1997 | |
| GB | 2 043 208 | | 10/1980 | |
| JP | 2-227558 | * | 9/1990 | 290/48 |

* cited by examiner

*Primary Examiner*—Andrew M. Dolinar
(74) *Attorney, Agent, or Firm*—Oblon, Spivak, McClelland, Maier & Neustadt, P.C.

(57) ABSTRACT

When a first motor MG1 cranks and starts an engine 150 that is in the cold, the revolving speed of the engine does not increase quickly 150. It is accordingly required to control the first motor MG1, in order to prevent electric power 194 stored in a battery from being wasted. A starting control apparatus does not cause the first motor MG1 to output a torque corresponding to a difference between a target revolving speed N* and an actual revolving speed Ne of the engine 150, but gradually increases a target torque STG by the open-loop control and restricts the magnitude of the target torque STG to a preset maximum torque STGMAX, which depends upon a cooling water temperature Tw of the engine 150. When the engine 150 is in the cold, the high viscosity of lubricant causes the revolving speed of the engine 150 not to quickly increase in response to the high target torque set to the first motor MG1. In this case, the maximum of the target torque is restricted to a smaller value, so as to prevent the electric power stored in the battery 194 from being wasted. The injection allowable revolving speed, at which the fuel injection to the engine 150 is allowed to start, is also set equal to a small value. This causes the engine 150 to start self driving at an earlier timing, thereby saving the electric power consumed by the first motor MG1.

14 Claims, 18 Drawing Sheets

| COOLING WATER TEMPERATURE Tw | -30 | -10 | 0 | 10 | 30 |
|---|---|---|---|---|---|
| MAXIMUM TORQUE | 20 | 20 | 25 | 30 | 30 |

| COOLING WATER TEMPERATURE Tw | -10 | 0 | 10 | 80 |
|---|---|---|---|---|
| INJECTION-ALLOWABLE REVOLVING SPEED SNEF | 100 | 300 | 500 | 800 |

REMAINING CHARGE BRM OF BATTERY

Fig. 16
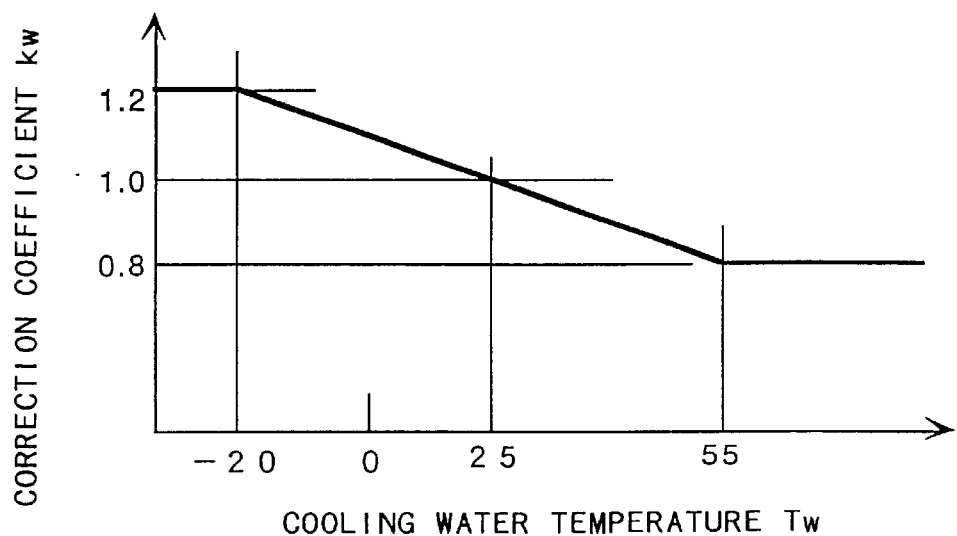
| COOLING WATER TEMPERATURE Tw | -10 | 0 | 80 |
|---|---|---|---|
| PRESET TIME Tsst FOR FULL COMBUSTION DETERMINATION | 5sec | 3 | 0.3 |
Fig. 18
Fig. 19
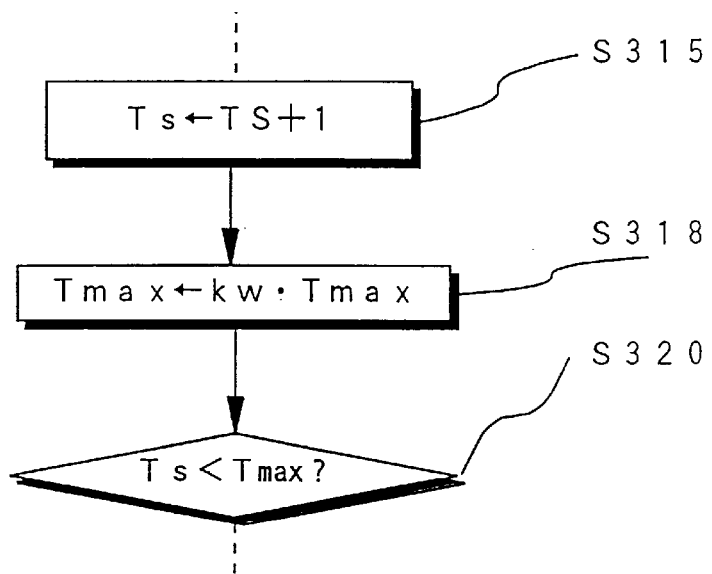

STARTING CONTROL APPARATUS FOR INTERNAL COMBUSTION ENGINE

This application is a Division of application Ser. No. 09/149,661 Filed on Sep. 9, 1998, now U.S. Pat. No. 6,247,437 B1.

BACKGROUND OF THE INVENTION

1. Field of the Invention

The present invention relates to an apparatus that starts an internal combustion engine that is linked with a rotating shaft of a motor via a damper, a starting control method, and a starting control apparatus for a hybrid vehicle with an internal combustion engine and a motor mounted thereon.

2. Description of the Related Art

A typical structure to start an internal combustion engine mounted on a vehicle cranks the internal combustion engine with a self-starting motor, which is specifically used for starting and linked with a rotating shaft of the internal combustion engine, and simultaneously feeds a supply of fuel. The self-starting motor is a small-sized motor for starting the internal combustion engine and enables the internal combustion engine to be rotated only to a significantly lower revolving speed (several hundred rpm) than an idle speed. The internal combustion engine is driven to a certain level of revolving speed that enables subsequent self starting and driving, through combustion of the supplied fuel.

In a hybrid vehicle which has an internal combustion engine and a motor mounted thereon and outputs a power for driving at least from the motor, some proposed systems do not have a self-starting motor specifically used for starting but uses a motor that is linked with a rotating shaft of an internal combustion engine to start the internal combustion engine (for example, JAPANESE PATENT LAID-OPEN GAZETTE No. 6-144020 and No. 9-222064. In this system, the rotating shaft of the internal combustion engine is linked with a rotating shaft of a first motor via a first clutch, whereas the rotating shaft of the first motor is connected via a second clutch with a drive shaft that is mechanically linked with wheels. A second motor is further connected to the drive shaft. At the time of starting the internal combustion engine, while the first clutch is engaged and the second clutch is released, the first motor cranks or motors the internal combustion engine prior to a supply of fuel. When the revolving speed of the internal combustion engine becomes equal to or greater than a preset value, the supply of fuel is fed to the internal combustion engine, which subsequently starts through the compression and combustion of the air/fuel mixture. After the start of the internal combustion engine, the first motor is driven as a generator with the power output from the internal combustion engine to charge the battery or to output the power directly to the drive shaft and drive the vehicle while the second clutch is engaged.

In the conventional starting control apparatus for the hybrid vehicle, however, a large load is applied to the battery. The battery is exposed to an excessive load especially when the internal combustion engine has poor startability. This is ascribed to the following reasons:

(1) In the hybrid vehicle, the motor is larger in size than the conventional self-starting motor and consumes a greater amount of electric power;

(2) In the hybrid vehicle, the rotor of the motor, which has a significantly larger mass than that of the self-starting motor, is connected to the rotating shaft of the engine. This often causes torsional resonance. A large torque is output from the motor, in order to enable the revolving speed of the internal combustion engine to quickly pass through the range of possible torsional resonance. This increases the electric power consumed by the motor.

(3) In the hybrid vehicle, the motor can increase the revolving speed of the internal combustion engine to a higher level than that in the conventional vehicle. The supply of fuel to the internal combustion engine and the combustion of the air/fuel mixture accordingly start at the higher revolving speed, since the start of combustion at the higher revolving speed improves the emission. The increase in revolving speed of the internal combustion engine to the higher level, however, increases the amount of electric power consumed by the motor.

Among these problems, (2) and (3) are not negligible especially when the internal combustion engine is cold. When the internal combustion engine is cold, the high viscosity of lubricant causes the revolving speed of the internal combustion engine not to quickly increase, in response to supply of electric current to allow output of a large torque from the motor. A large electric power is accordingly consumed before the revolving speed reaches a preset level (for example, 800 rpm). The problems (1) through (3) are not only observed in the hybrid vehicle but in any other structures that use a large-sized self-starting motor.

One proposed countermeasure uniformly limits the supply of electricity from the battery according to the elapse of time (for example, JAPANESE PATENT LAID-OPEN GAZETTE No. 63-297767). This uniform limitation is, however, not practical, since a little more continuance of cranking may start the internal combustion engine. Especially in the case of the large-sized self-starting motor, one cranking operation consumes a large amount of electric power. Several tries of starting with limitation of the cranking time cause the battery to be exposed to a greater load.

SUMMARY OF THE INVENTION

The object of the present invention is to start an internal combustion engine without causing a battery to be exposed to an excessive load even when the internal combustion engine is cold.

The present invention realizes at least part of the above and the other related objects, based on the following two principles. The first principle is that the output torque of the motor for rotating the internal combustion engine is restricted to a smaller value in response to the lower startability of the internal combustion engine. The second principle is that the supply of electricity is restricted when the output torque of the motor does not have a negative value during a starting control operation. These principles are favorably applicable to the internal combustion engine having a starting motor, as the starting control apparatus for the internal combustion engine or the method of starting the internal combustion engine especially in the hybrid vehicle, as discussed below.

The present invention is directed to a first starting control apparatus for an internal combustion engine that rotates the internal combustion engine, which is connected via a damper with a rotating shaft of a motor driven by a battery, with the motor so as to start the internal combustion engine. The first starting control apparatus includes: a startability detection unit that detects a parameter relating to startability of the internal combustion engine; and an output torque restriction unit that restricts an output torque of the motor for rotating the internal combustion engine to a smaller value, in response to lower startability of the internal combustion engine specified from the parameter detected by the internal combustion engine startability detection unit.

The present invention is also directed to a first method of starting an internal combustion engine, which corresponds to the first starting control apparatus. The first method rotates an internal combustion engine, which is connected via a damper with a rotating shaft of a motor driven by a battery, with the motor so as to start the internal combustion engine. The first method includes the steps of: (a) detecting a parameter relating to startability of the internal combustion engine: and (b) restricting an output torque of the motor for rotating the internal combustion engine to a smaller value, in response to lower startability of the internal combustion engine specified from the parameter detected in the step (a).

In the first starting control apparatus for the internal combustion engine and the corresponding first method, in response to the lower startability of the internal combustion engine, the output torque of the motor for rotating the internal combustion engine is restricted to a smaller value. This arrangement effectively prevents the electric power from being wasted when the internal combustion engine has poor startability and the revolving speed of the internal combustion engine is not quickly increased by application of the torque from the motor.

It is preferable that the supply of fuel to the internal combustion engine starts at the lower revolving speed in response to the lower startability of the internal combustion engine. This arrangement effectively prevents the motor from being driven over a long time period prior to a start of the fuel supply and excessively consuming the electric power of the battery. The internal combustion engine that receives the supply of fuel tries self rotation through the combustion of the air/fuel ratio. In the state of full combustion, the internal combustion engine starts self driving.

In the first starting control apparatus for the internal combustion engine and the corresponding first method, the parameter relating to the startability of the internal combustion engine may be a temperature of the internal combustion engine. The startability of the internal combustion engine is affected by the adhesion of the supplied fuel to an intake port or the viscosity of lubricant, so that the temperature of the internal combustion engine is a preferable parameter relating to the startability of the internal combustion engine. The cooling water temperature, the temperature of lubricant, or the intake air temperature may be used as the temperature of the internal combustion engine.

In accordance with one preferable application, the first starting control apparatus further includes: a full combustion determination unit for determining that the internal combustion engine is in a state of full combustion, based on a driving condition of the internal combustion engine; a time count unit for determining that a predetermined time period has elapsed since a start of cranking the internal combustion engine by the motor; and a starting control discontinuance unit that cuts off a supply of electricity from the battery to the motor and once stops starting control of the internal combustion engine, when the full combustion determination unit determines that the internal combustion engine is not in the state of full combustion while the time count unit determines that the predetermined time period has elapsed.

The starting control apparatus of this preferable structure determines that the internal combustion engine is in the state of full combustion, and cuts off the supply of electricity from the battery to the motor and stops the starting control of the internal combustion engine, when the internal combustion engine does not fall into the state of full combustion within the predetermined time period. This arrangement effectively prevents the electric power of the battery from being consumed over a long time period without causing the internal combustion engine to fall into the state of full combustion.

In accordance with one preferable structure, the full combustion determination unit includes a torque measuring unit that measures an actual output torque of the motor as the driving condition of the internal combustion engine. The full combustion determination unit determines that the internal combustion engine is in the state of full combustion when the actual output torque measured by the torque detection unit has a negative value. The output torque of the motor is regulated at the time of starting the internal combustion engine. The measurement of the actual output torque thus assures the determination of whether or not the internal combustion engine is in the state of full combustion.

In the starting control apparatus that carries out the full combustion determination, it is preferable that a greater value is set to the predetermined time period, which is a target of the determination by the time count unit, in response to the lower startability of the internal combustion engine specified from the parameter. As is known, the lower startability results in extending the time period required for the full combustion. In this case, the uniform discontinuance of the starting control after the elapse of the preset time period may cause the electric power of the battery to be wastefully consumed. This preferable arrangement extends the time period for the full combustion determination in the case of the lower startability, thereby enabling the accurate and efficient determination of starting the internal combustion engine. The predetermined time period for the full combustion determination may be based on the time or the integrated revolving speed of the internal combustion engine.

Another preferable structure estimates an amount of electric power suppliable from the battery and sets a greater value to the predetermined time period, which is a target of the determination by the time count unit, for the greater amount of estimated electric power. When it is assumed that the large electric power is suppliable from the battery, the time period for stating control is extended. The starting control can be continued in the case where the suppliable electric power is sufficient. This arrangement effectively prevents the supply of electricity from the battery from being cut off while a little more continuance causes the internal combustion engine to fall into the state of full combustion. This prevents the electric power from being wasted.

The electric power suppliable from the battery is generally estimated in the process of control of the battery. Another available technique measures the suppliable electric power directly. Still another available technique measures the temperature of the battery and corrects the estimated value of suppliable electric power to a higher value at the higher observed temperature.

Still another preferable structure integrates electric power consumed by the battery since the start of cranking and determines that the predetermined time period has elapsed when the integrated electric power reaches a preset reference value. This structure enables the electric power of the battery to be efficiently used for cranking without causing excessive discharge.

In this case, one preferable structure measures the temperature of the battery, and corrects the preset reference value, which is used for the full combustion determination, to a smaller value at the lower observed battery temperature. When a decrease in performance of the battery is expected, for example, when the vehicle is cold, the full combustion determination is carried out at an earlier timing. This arrangement discontinues the consumption of electric power when the internal combustion engine is not in the state of full combustion. This prevents the battery from being exposed to the excessive loading.

Another preferable application of the first starting control apparatus adjusts an open-close timing of an air intake valve of the internal combustion engine, in order to lower an effective compression ratio of the internal combustion engine, at a time of starting the internal combustion engine. The decrease in effective compression ratio decreases the loading seen from the motor and enables the revolving speed of the internal combustion engine to quickly increase.

The starting control apparatus for the internal combustion engine is applicable to the conventional structure that starts the internal combustion engine with a self-starting motor, but is especially effective in the hybrid vehicle where the motor, which adds a torque to the output of the internal combustion engine and regenerates electric power from the output of the internal combustion engine or the braking force, is attached to the output shaft of the internal combustion engine. In the hybrid vehicle, it is required to quickly increase the revolving speed of the internal combustion engine at the time of starting the internal combustion engine, because of the possibility of torsional resonance, as described below.

The crankshaft or output shaft of the internal combustion engine is generally a resilient body, which has a mass distribution, and thereby forms a vibrational system of infinite degree of freedom. A torque variation due to the combustion or the reciprocating motions of the piston causes torsional vibrations. When the natural frequency and the forced frequency of the axis coincide with each other, torsional resonance occurs. An increase in amplitude of the torsional vibration causes a foreign noise or wear of the gear in the crankshaft system and, in some cases, a fatigue of the crankshaft. The torsional resonance often occurs when the revolving speed of the crankshaft is less than an idle speed. In the apparatus that motors the internal combustion engine with the motor that is connected to the crankshaft of the internal combustion engine via a damper, the torsional resonance accordingly occurs at the time of starting the internal combustion engine.

In the hybrid vehicle where the torsional resonance often occurs, the high torque is output from the motor, in order to enable the revolving speed of the internal combustion engine to quickly pass through the range of possible torsional resonance at the time of starting the internal combustion engine. This causes the large power consumption of the battery. The above structures accordingly have significant effects on prevention of wasteful power consumption.

As described above, there is a unique problem in the hybrid vehicle where the motor, which adds a torque to the output of the internal combustion engine and regenerates electric power from the output of the internal combustion engine or the braking force, is attached to the output shaft of the internal combustion engine. The present invention is accordingly directed to a second starting control apparatus that starts an internal combustion engine with a motor, in a hybrid vehicle having the internal combustion engine, which is connected via a damper with a rotating shaft of the motor driven by a battery. The second starting control apparatus includes: a torque control unit that controls an output torque of the motor, based on a relationship between an output torque of the internal combustion engine and a torque required for the drive shaft; a torque detection unit for detecting that the output torque of the motor has a negative value; and an supply of electricity limiting unit that causes the torque detection unit to carry out the determination while the motor cranks the internal combustion engine, and limits a supply of electricity from a battery to the motor when the output torque of the motor does not have a negative value.

The present invention is also directed to a second method of starting an internal combustion engine, which corresponds to the second starting control apparatus. In a hybrid vehicle having an internal combustion engine, which is connected via a damper with a rotating shaft of a motor driven by a battery, the second method rotates the internal combustion engine with the motor so as to start the internal combustion engine. The second method includes the steps of: controlling an output torque of the motor, based on a relationship between an output torque of the internal combustion engine and a torque required for the drive shaft; determining that the output torque of the motor has a negative value while the motor cranks the internal combustion engine; and cutting off a supply of electricity from a battery to the motor when the output torque of the motor does not have a negative value.

In the second starting control apparatus and the corresponding second method, it is determined whether or not the output torque of the motor has a negative value. In the case where the output torque does not have a negative value, it is determined that the internal combustion engine has not started yet, and the supply of electricity to the motor is restricted. This structure readily and accurately carries out the full combustion determination based on the output torque of the motor, thereby ensuring the appropriate starting control without causing the battery to be exposed to the excessive loading.

In accordance with one preferable application, the second starting control apparatus further includes a time count unit for determining that a predetermined time period has elapsed since a start of cranking the internal combustion engine by the motor, wherein the supply of electricity limiting unit causes the torque detection unit to carry out the determination at a specific time point when the time count unit determines that the predetermined time period has elapsed, and cuts off a supply of electricity from the battery to the motor, so as to stop the cranking of the internal combustion engine, when the output torque of the motor does not have a negative value at the specific time point.

This arrangement enables the full combustion determination to be carried out at a desired timing. When the output torque of the motor does not have a negative value, this structure cuts off the supply of electricity and thereby prevents the battery from being exposed to the excessive loading.

The preferable structures of the first starting control apparatus discussed above are also applicable to the second starting control apparatus. One possible structure detects a parameter relating to the startability of the internal combustion engine and adjusts the predetermined time period for the full combustion determination. Another possible structure estimates the electric power suppliable from the battery and extends the predetermined time period based on the estimated value. It is also preferable to correct the estimated value of suppliable electric power to a higher value at the higher observed battery temperature.

Still another possible structure integrates electric power consumed by the battery since the start of cranking and determines that the predetermined time period for full combustion determination has elapsed when the integrated electric power reaches a preset reference value. In this structure, it is preferable that the preset reference value is specified by taking into account the battery temperature.

Another preferable application of the second starting control apparatus adjusts the open-close timing of the air intake valve of the internal combustion engine, in order to lower the effective compression ratio of the internal combustion engine, at the time of starting the internal combustion engine.

The first starting control apparatus for the internal combustion engine is applicable to the hybrid vehicle. The present invention is accordingly directed to a first starting control apparatus for a hybrid vehicle, which starts an internal combustion engine in a hybrid vehicle that takes out power of the internal combustion engine in an electrical form and outputs power of a motor at least to a drive shaft of the vehicle. The first starting control apparatus for the hybrid vehicle includes: a motor that cranks the internal combustion engine at a start of the internal combustion engine; a starting-time fuel supply unit that controls a supply of fuel to the internal combustion engine, simultaneously with cranking of the internal combustion engine by the motor; a startability detection unit that detects a parameter relating to startability of the internal combustion engine; and an output torque restriction unit that restricts an output torque of the motor for rotating the internal combustion engine to a smaller value at the time of cranking, in response to lower startability of the internal combustion engine specified from the parameter detected by the internal combustion engine startability detection unit.

The present invention is further directed to a second starting control apparatus for a hybrid vehicle, which corresponds to the second starting control apparatus for the internal combustion engine. The second starting control apparatus starts an internal combustion engine in a hybrid vehicle that takes out power of the internal combustion engine in an electrical form and outputs power of a motor at least to a drive shaft of the vehicle. The second starting control apparatus includes: the motor that cranks the internal combustion engine at a start of the internal combustion engine; a starting-time fuel supply unit that controls a supply of fuel to the internal combustion engine, simultaneously with cranking of the internal combustion engine by the motor; a torque control unit that controls-an output torque of the motor, based on a relationship between an output torque of the internal combustion engine and a torque required for the drive shaft; a torque detection unit for detecting that the output torque of the motor has a negative value; and an electricity cut-off unit that causes the torque detection unit to carry out the determination while the motor cranks the internal combustion engine, and cuts off a supply of electricity from a battery to the motor when the output torque of the motor does not have a negative value.

These apparatuses can start the internal combustion engine in the hybrid vehicle without causing the battery to be exposed to an excessive load.

These and other objects, features, aspects, and advantages of the present invention will become more apparent from the following detailed description of the preferred embodiments with the accompanying drawings.

BRIEF DESCRIPTION OF THE DRAWINGS

FIG. 16 is a table showing a relationship between the cooling water temperature Tw of the engine 150 and the preset value Tsst representing the time period for full combustion determination, which is used in the first embodiment;

FIG. 18 is a graph showing the correction coefficient kw plotted against the cooling water temperature Tw of the engine 150, which is used in a second embodiment according to the present invention;

FIG. 19 is a flowchart showing a processing for correcting the limit value Tmax with the correction coefficient kw in the second embodiment;

DESCRIPTION OF THE PREFERRED EMBODIMENTS

Figure 1:
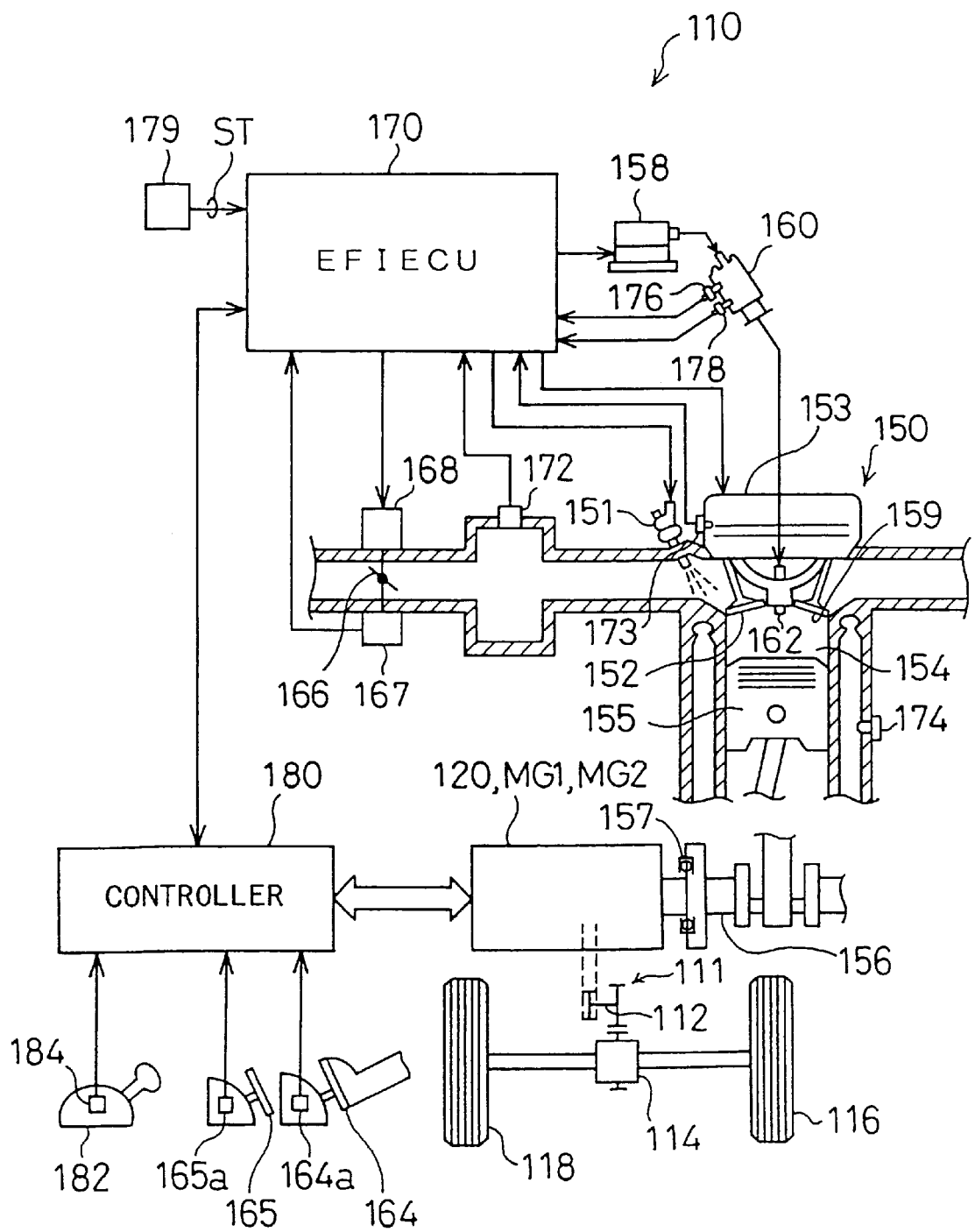
FIG. 1 schematically illustrates the structure of a vehicle with a power output apparatus 110 mounted thereon as an embodiment according to the present invention.

Some modes of carrying out the present invention are discussed below as preferred embodiments. FIG. 1 schematically illustrates the structure of a vehicle with a power output apparatus 110 mounted thereon as an embodiment according to the present invention. As illustrated in FIG. 1, the vehicle is provided with an engine 150 which consumes gasoline as a fuel and outputs power. The air ingested from an air supply system via a throttle valve 166 is mixed with a fuel, that is, gasoline in this embodiment, injected from a fuel injection valve 151. The air/fuel mixture is supplied into a combustion chamber 154 via an air intake valve 152 to be explosively ignited and burned. Linear motion of a piston 155 pressed down by the combustion of the air/fuel mixture is converted to rotational motion of a crankshaft 156. The throttle valve 166 is driven to open and close by an actuator 168 and regulates the amount of the ingested air. An ignition plug 162 converts a high voltage applied from an igniter 158 via a distributor 160 to a spark, which explosively ignites and combusts the air/fuel mixture.

The engine 150 is provided with an open-close timing changing mechanism 153 that changes the open and close timing of the air intake valve 152. The open-close timing changing mechanism 153 leads or lags the phase of an intake cam shaft (not shown), which opens and closes the air intake valve 152, relative to a crank angle, so as to regulate the open and close timing of the air intake valve 152. An electronic control unit (hereinafter referred to as the EFIECU) 170 feedback controls the lead angle and the lag angle of the phase of the intake cam shaft to attain a target phase, based on a signal output from a cam shaft position sensor 173, which measures the position of the intake cam shaft. A concrete structure of the open-close timing changing mechanism 153 will be described later.

The operation of the engine 150 is controlled by the EFIECU 170. The EFIECU 170 receives information from various sensors, which detect operating conditions of the engine 150. These sensors include a throttle valve position sensor 167 for detecting a valve travel or position of the throttle valve 166, a manifold vacuum sensor 172 for measuring a load applied to the engine 150, the cam shaft position sensor 173 for measuring the position of the intake cam shaft, a water temperature sensor 174 for measuring the temperature of cooling water in the engine 150, and a speed sensor 176 and an angle sensor 178 mounted on the distributor 160 for measuring the revolving speed (the number of revolutions per a predetermined time period) and the rotational angle of the crankshaft 156. A starter switch 179 for detecting a starting condition ST of an ignition key (not shown) is also connected to the EFIECU 170. Other sensors and switches connecting with the EFIECU 170 are omitted from the illustration.

The crankshaft 156 of the engine 150 is linked via a damper 157 with a planetary gear 120 and first and second motors MG1 and MG2 (described later). The crankshaft 156 is further connected to a differential gear 114 via a power transmission gear 111, which has a drive shaft 112 as a rotating axis. The power output from the power output apparatus 110 is thus eventually transmitted to left and right driving wheels 116 and 118. The first motor MG1 and the second motor MG2 are electrically connected to and controlled by a controller 180. The controller 180 includes an internal control CPU and receives inputs from a gearshift position sensor 184 attached to a gearshift 182, an accelerator position sensor 164a attached to an accelerator pedal 164, and a brake pedal position sensor 165a attached to a brake pedal 165, as described later in detail. The controller 180 sends and receives a variety of data and information to and from the EFIECU 170 through communication. Details of the control procedure including a communication protocol will be described later.

Figure 2:
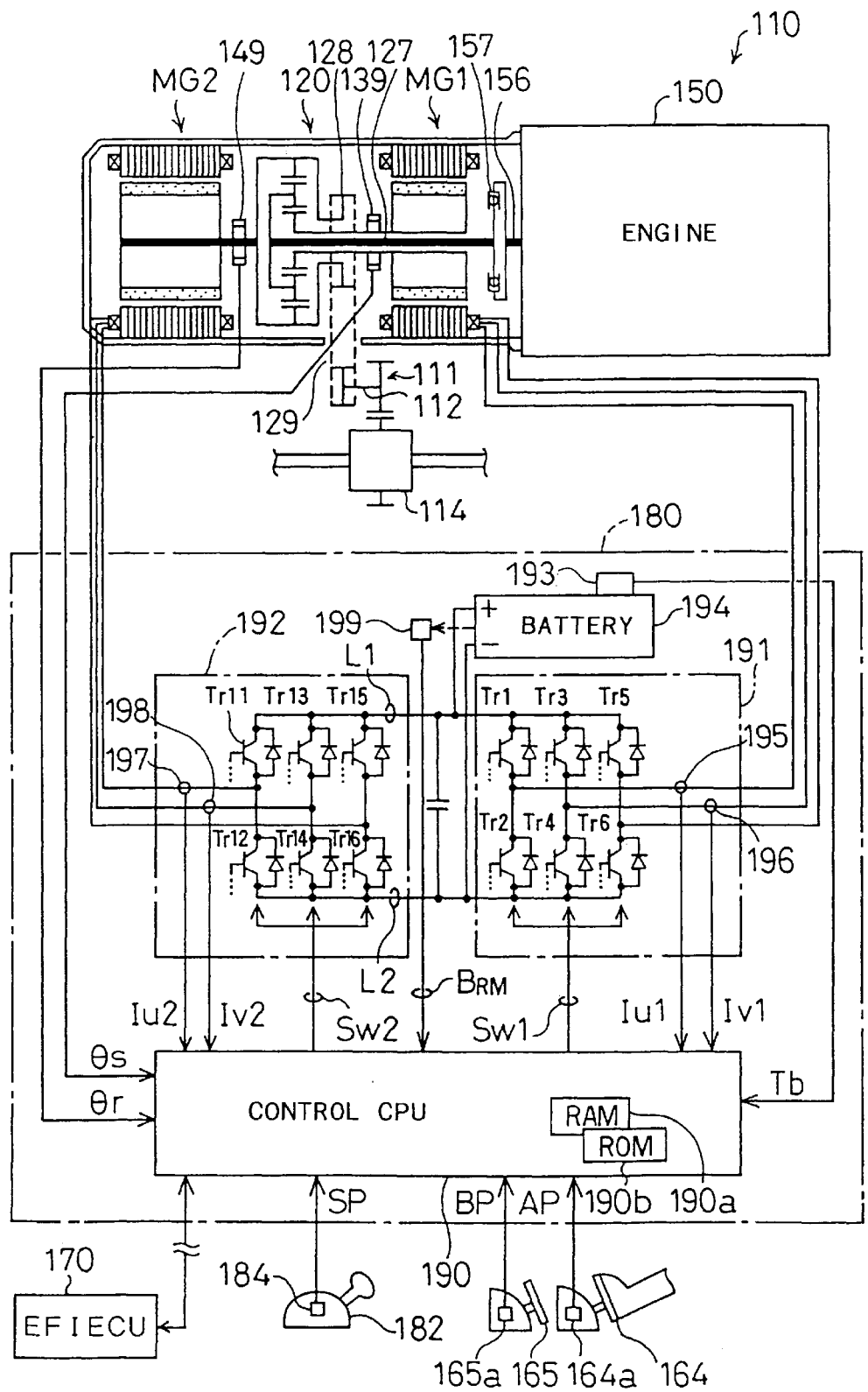
FIG. 2 illustrates the structure of the power output apparatus 110 including a planetary gear 120, a first motor MG1, a second motor MG2, and a controller 180.

FIG. 2 illustrates the structure of the power output apparatus 110 including the planetary gear 120, the first motor MG1, the second motor MG2, and the controller 180. The power output apparatus 110 primarily includes the engine 150, the planetary gear 120 having a planetary carrier 124 linked with a carrier shaft 127, the first motor MG1 linked with a sun gear 121 of the planetary gear 120, the second motor MG2 linked with a ring gear 122 of the planetary gear 120, and the controller 180 for driving and controlling the first and the second motors MG1 and MG2. The damper 157 connects the crankshaft 156 of the engine 150 with the carrier shaft 127 to reduce the amplitude of torsional vibration of the crankshaft 156.

Figure 3:
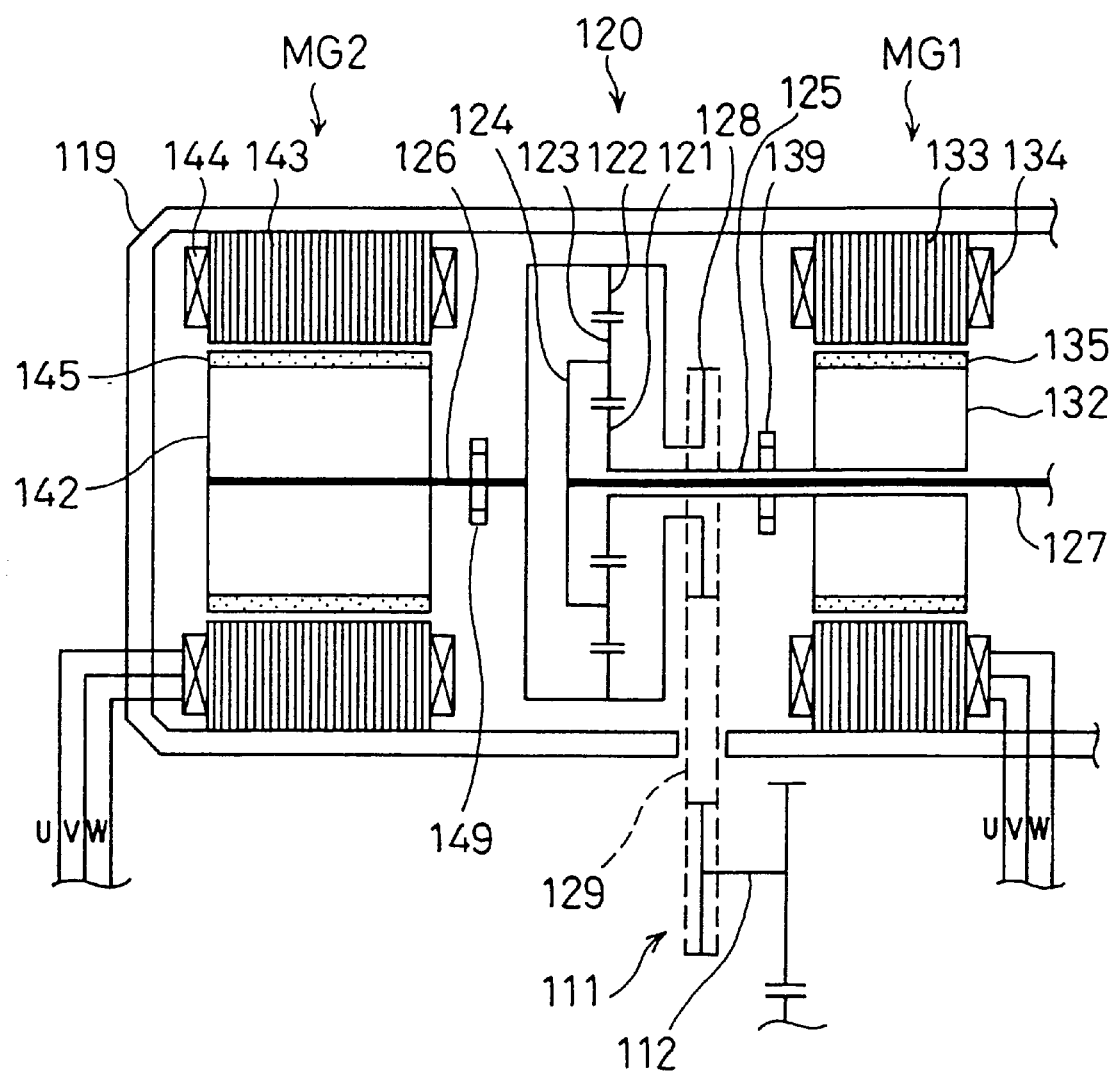
FIG. 3 is an enlarged view illustrating the planetary gear 120, the first motor MG1, and the second motor MG2 of the power output apparatus 110.

FIG. 3 is an enlarged view illustrating the planetary gear 120, the first motor MG1, and the second motor MG2 of the power output apparatus 110. The planetary gear 120 includes the sun gear 121 linked with a hollow sun gear shaft 125 which the carrier shaft 127 passes through, the ring gear 122 linked with a ring gear shaft 126 coaxial with the crankshaft 156, a plurality of planetary pinion gears 123 arranged between the sun gear 121 and the ring gear 122 to revolve around the sun gear 121 while rotating on its axis, and the planetary carrier 124 connecting with one end of the carrier shaft 127 to support the rotating shafts of the planetary pinion gears 123. In the planetary gear 120, three shafts, that is, the sun gear shaft 125, the ring gear shaft 126, and the carrier shaft 127 respectively connecting with the sun gear 121, the ring gear 122, and the planetary carrier 124, work as input and output shafts of the power. Determination of the powers input to and output from any two shafts among the three shafts automatically determines the power input to and output from the residual one shaft. The details of the input and output operations of the power into and from the three shafts of the planetary gear 120 will be discussed later.

A power feed gear 128 for taking out the power is linked with the ring gear 122 and arranged on the side of the first motor MG1. The power feed gear 128 is further connected to the power transmission gear 111 via a chain belt 129, so that the power is transmitted between the power feed gear 128 and the power transmission gear 111.

The first motor MG1 is constructed as a permanent magnets-type synchronous motor-generator and includes a rotor 132 having a plurality of permanent magnets 135 on its outer surface and a stator 133 having three-phase coils 134 wound thereon to form a revolving magnetic field. The rotor 132 is linked with the sun gear shaft 125 connecting with the sun gear 121 of the planetary gear 120. Both the rotor 132 and the stator 133 are prepared by laying thin plates of non-directional electromagnetic steel one upon another. When the electric currents are made to flow through the three-phase coils 134 for a torque output, the first motor MG1 works as a motor for rotating the rotor 132 through the interaction between a magnetic field produced by the permanent magnets 135 and a magnetic field produced by the three-phase coils 134. When the rotor 132 is rotated by an external power source and electric currents are taken out of the three-phase coils 134, on the other hand, the first motor MG1 works as a generator for generating an electromotive force on either ends of the three-phase coils 134 through the interaction between the magnetic field produced by the permanent magnets 135 and the rotation of the rotor 132. The sun gear shaft 125 is further provided with a resolver 139 for measuring its rotational angle θs.

Like the first motor MG1, the second motor MG2 is also constructed as a permanent magnets-type synchronous motor-generator and includes a rotor 142 having a plurality of permanent magnets 145 on its outer surface and a stator 143 having three-phase coils 144 wound thereon to form a revolving magnetic field. The rotor 142 is linked with the ring gear shaft 126 connecting with the ring gear 122 of the planetary gear 120, whereas the stator 143 is fixed to the casing 119. The rotor 142 and the stator 143 of the second motor MG2 are also prepared by laying thin plates of non-directional electromagnetic steel one upon another. Like the first motor MG1, the second motor MG2 also works as a motor or a generator. The ring gear shaft 126 is further provided with a resolver 149 for measuring its rotational angle θr.

The controller 180 for driving and controlling the first and the second motor MG1 and MG2 has the following configuration. As shown in FIG. 2, the controller 180 includes a first driving circuit 191 for driving the first motor MG1, a second driving circuit 192 for driving the second motor MG2, a control CPU 190 for controlling both the first and the second driving circuits 191 and 192, and a battery 194 including a number of secondary cells. The control CPU 190 is a one-chip microprocessor including a RAM 190a, which data are temporarily written in and read from, a ROM 190b in which various control programs are stored in advance, an input/output port (not shown), and a serial communication port (not shown) through which data are sent to and received from the EFIECU 170.

The control CPU 190 receives a variety of data via the input port. The input data include a rotational angle θs of the sun gear shaft 125 measured with the resolver 139, a rotational angle θr of the ring gear shaft 126 measured with the resolver 149, an accelerator pedal position AP (step-on amount of the accelerator pedal 164) output from the accelerator position sensor 164a, a brake pedal position BP (step-on amount of the brake pedal 165) output from the brake pedal position sensor 165a, and a gearshift position SP output from the gearshift position sensor 184. The control CPU 190 is further connected with two ammeters 195 and 196 disposed in the first driving circuit 191 and two ammeters 197 and 198 disposed in the second driving circuit 192, so as to receive observed electric currents Iu1 and Iv1 flowing through the corresponding phases of the first motor MG1 and observed electric currents Iu2 and Iv2 flowing through the corresponding phases of the second motor MG2. The control CPU 190 is also connected with a battery temperature sensor 193 and a remaining charge meter 199, so as to receive an observed temperature Tb of the battery 194 and an observed remaining charge BRM of the battery 194. The battery temperature sensor 193 is actually provided for each of plural cells constituting the battery 194. One representative temperature (for example, one of the maximum temperature, the minimum temperature, and the mean temperature) is here regarded as the battery temperature Tb. The representative temperature depends upon the application of the power output apparatus 110. The remaining charge meter 199 may determine the remaining charge BRM of the battery 194 by any known method; for example, by measuring the specific gravity of an electrolytic solution in the battery 194 or the whole weight of the battery 194, by computing the currents and time of charge and discharge, or by causing an instantaneous short circuit between terminals of the battery 194 and measuring an internal resistance against the electric current.

The control CPU 190 outputs a first control signal SW1 for driving six transistors Tr1 through Tr6 working as switching elements of the first driving circuit 191 and a second control signal SW2 for driving six transistors Tr11 through Tr16 working as switching elements of the second driving circuit 192. The six transistors Tr1 through Tr6 in the first driving circuit 191 constitute a transistor inverter and are arranged in pairs to work as a source and a drain with respect to a pair of power lines L1 and L2. The three-phase coils (U,V,W) 134 of the first motor MG1 are connected to the respective contacts of the paired transistors in the first driving circuit 191. The power lines L1 and L2 are respectively connected to plus and minus terminals of the battery 194. The control CPU 190 outputs the control signal SW1 and successively PWM controls the ratio of the ON time of the paired transistors Tr1 through Tr6. This enables the first motor MG1 to carry out energy conversion between the electric power and the power. When the first motor MG1 outputs power or carries out the power control, the on-off control of the transistors Tr1 through Tr6 at a predetermined timing corresponding to the rotational angle θs of the rotor 132 measured with the resolver 139 causes the electric currents flowing through the respective phases of the three-phase coils 134 of the first motor MG1 to form quasi-sine waves having the phase shift of 120 degrees. This generates a revolving magnetic field on the stator 133 and enables the rotor 132 to be rotated at a predetermined torque and a predetermined revolving speed. When the first motor MG1 regenerates electrical energy from the power, on the other hand, the on-off control of the transistors Tr1 through Tr6 at a predetermined timing corresponding to the rotational angle θs of the rotor 132 measured with the resolver 139 causes the three-phase coils 134 to induce three-phase alternating currents having a frequency corresponding to the revolving speed of the rotor 132. This enables the electric power to be recovered in the battery 194. The recovered energy works as a load or braking force to the outside structure.

The six transistors Tr11 through Tr16 in the second driving circuit 192 also constitute a transistor inverter and are arranged in the same manner as the transistors Tr1 through Tr6 in the first driving circuit 191. The three-phase coils (U,V,W) 144 of the second motor MG2 are connected to the respective contacts of the paired transistors in the second driving circuit 192. The second control signal SW2 output from the control CPU 190 successively controls the ON time of the paired transistors Tr11 through Tr16. In the same manner as that of the first motor MG1 and the first driving circuit 191, the second motor MG2 and the second driving circuit 192 thus freely carry out energy conversion between the power and the electric power.

In the vehicle with the power output apparatus 110 mounted thereon, while the energy balance is kept in a predetermined time period, the engine 150 is stationarily driven in a driving range of high driving efficiency and favorable emission. Torque conversion is carried out under the condition of energy balance, in the case where the torque of the drive shaft 112 does not coincide with the required torque or in the case where the revolving speed of the drive shaft 112 does not coincide with the required revolving speed. By way of example, when the revolving speed of the crankshaft 156 of the engine 150 is higher than the revolving speed of the drive shaft 112 and the torque output from the engine 150 is smaller than the torque of the drive shaft 112, the torque conversion causes the first motor MG1 to convert part of the power output from the engine 150 into the electric power and drive the second motor MG2 with the regenerated electric power. When the torque output from the engine 150 is greater than the torque of the drive shaft 112 and the revolving speed of the crankshaft 156 is lower than the revolving speed of the drive shaft 112, on the other hand, the torque conversion causes the second motor MG2 to convert part of the output power of the engine 150 into the electric power and drive the first motor MG1 with the regenerated electric power.

In another example, the drive shaft 112 is driven while the battery 194 is charged or discharged. In the vehicle of the embodiment, the engine 150 is driven while priority is given to driving efficiency and emission, and the output of the engine 150 is not varied according to the required power for driving the vehicle. The output of the engine 150 accordingly does not balance the power required for the drive shaft 112. In this case, the battery 194 is discharged to supply the energy in the form of electricity and supplement the insufficiency or is charged to store the energy in the form of electricity. In the case where a large power is required for the drive shaft 112, for example, during acceleration or an up-slope drive, the electric power stored in the battery 194 is taken out to drive the second motor MG2. In the case where the output of the engine 150 exceeds the power required for the drive shaft 112 or where the braking energy can be recovered, for example, during a down-slope drive, a low-speed stationary drive, or a braking operation, on the other hand, the first motor MG1 and the second motor MG2 convert the surplus energy into the electric power and store the regenerated electric power into the battery 194. In this case, the engine 150 may be stopped. Start of acceleration or an up-slope drive causes the engine 150 at a stop to be reactivated.

Figure 4:
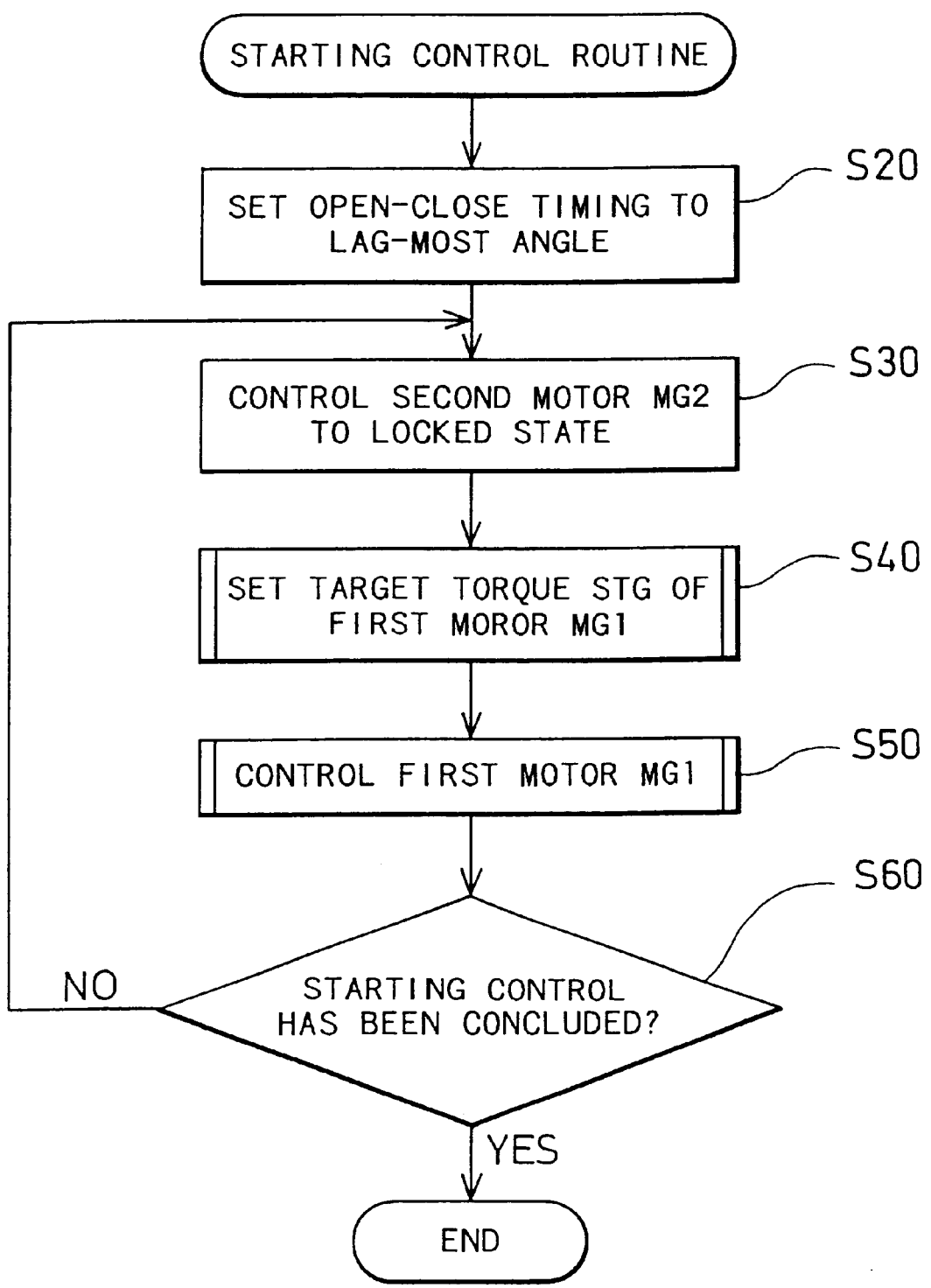
FIG. 4 is a flowchart showing a starting control routine in the first embodiment.

The controller 180 executes a starting control routine at the time of a start of the engine 150 of the power output apparatus 110. This embodiment controls stop and start of the engine 150 during a drive of the vehicle as described above. The ON operation of the starter switch 179 under the ceased condition of the vehicle also activates and starts the engine 150. In this case, the first motor MG1 is driven to start the engine 150. FIG. 4 is a flowchart showing a starting control routine executed when the engine 150 starts under the ceased condition of the vehicle.

When the program enters the routine, the open-close timing of the air intake valve 152 is set to the lag-most angle at step S20. In accordance with a concrete procedure, the control CPU 190 transmits a setting signal to the EFIECU 170 through communication, and the EFIECU 170 carries out the setting in response to the setting signal. The phase of the intake cam shaft is adjusted to make the open-close timing of the air intake valve 152 the lag-most angle. A concrete procedure of the phase adjustment will be described later. Setting the open-close timing of the air intake valve 152 to the lag-most angle minimizes the loading or the pumping work of the engine 150 seen from the first motor MG1.

The program then controls the second motor MG2 to be set in a locked state, in order to lock the drive shaft 112 at step S30. In order to prevent the ring gear shaft 126 from being driven and rotated by a torque applied to the ring gear shaft 126 in the process of motoring or cranking by the first motor MG2, a concrete procedure of step S30 causes a constant electric current, which can generate a counter torque in a reversed direction, to flow through the three-phase coils 144. At subsequent step S40, the program sets a target torque STG of the first motor MG1. The details of the setting will be described later with the flowchart of FIG. 5. After setting the target torque STG of the first motor MG1, the program controls the first motor MG1, in order to cause the target torque STG to be applied to the sun gear shaft 125 linked with the first motor MG1 at step S50. Since the ring gear shaft 126 is fixed by the second motor MG2, the torque applied to the sun gear shaft 125 by the first motor MG1 acts on the carrier shaft 127, with the ring gear shaft 126 as a counter force. The torque is transmitted to the crankshaft 156 of the engine 150 via the damper 157, so as to motor the engine 150. The target torque STG of the first motor MG1 is set to rotate the engine 150 at ordinary temperature under the condition of no supply of fuel with an increase in revolving speed equal to 25 rpm per 8 milliseconds.

After the control of the second motor MG2 and the first motor MG2, the program determines whether or not the starting control has been concluded at step S50. The processing of steps S30 through S50 is repeated until the starting control is completed. When the starting control has been concluded, the program exits from this routine. Irrespective of the execution or non-execution of this starting control routine, the controller 180 carries out the control to drive the drive shaft 112 at a torque and a revolving speed specified by the driving condition of the vehicle and the requirement of the driver. The starting control routine shown in FIG. 4 is on the assumption that the vehicle is at a stop. The second motor MG2 is accordingly controlled to the locked state not to drive the drive shaft 112. In the case where the vehicle is at a run, however, the second motor MG2 is driven with the sum of the torque required for driving and the torque against the counter force of cranking by the first motor MG1.

Figure 5:
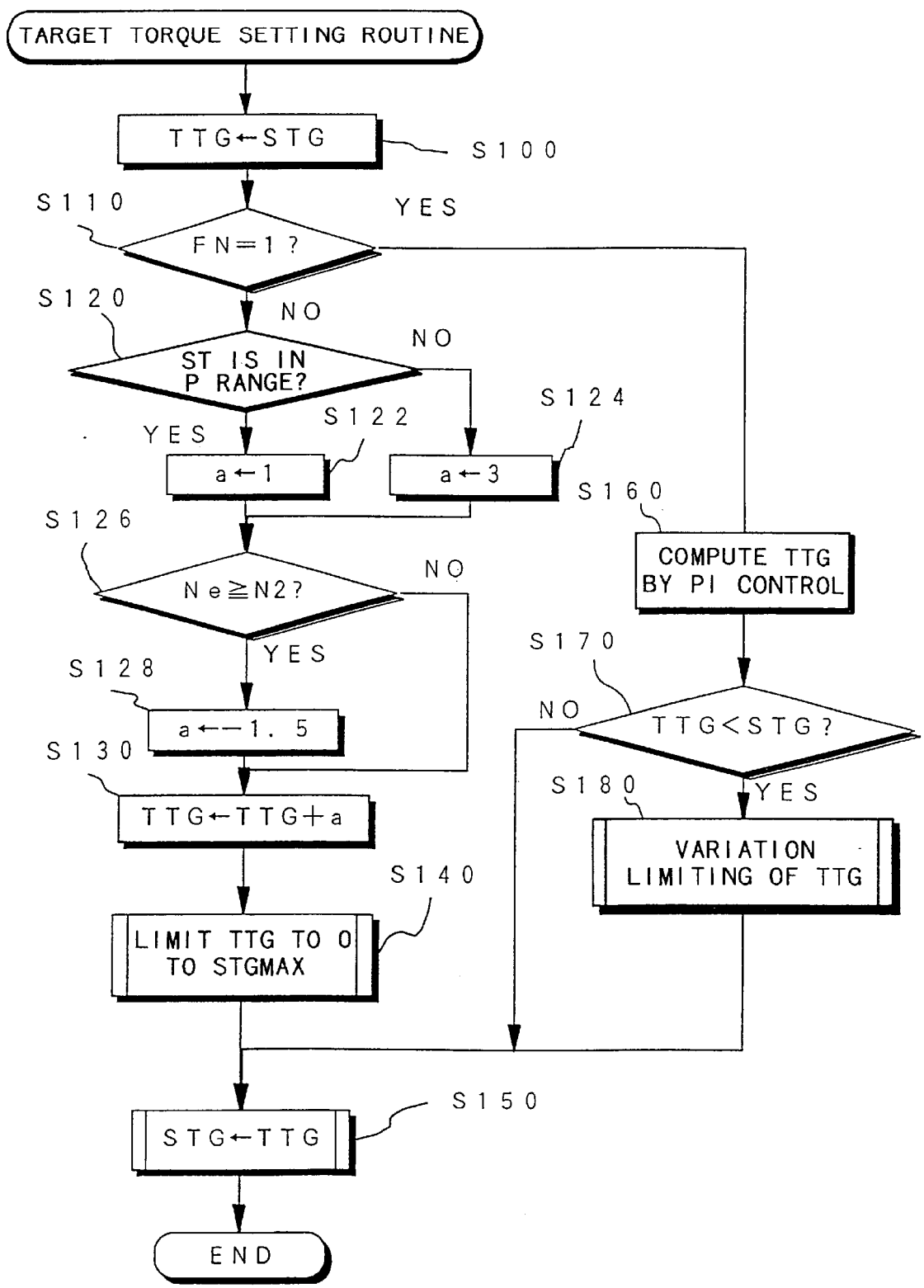
FIG. 5 is a flowchart showing the details of the processing for setting a target torque STG of the first motor MG1 at step S40 in the flowchart of FIG. 4.
Figure 6:
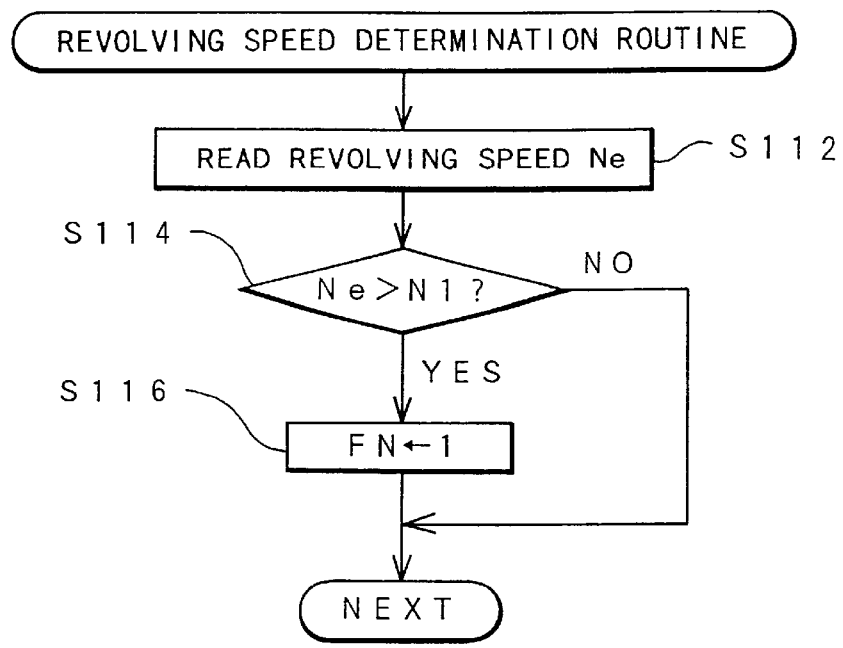
FIG. 6 is a flowchart showing a revolving speed determination routine that determines whether or not the revolving speed Ne of the engine 150 has exceeded a predetermined value N1.

The flowchart of FIG. 5 shows the details of the processing at step S40 in the flowchart of FIG. 4 to set the target torque STG of the first motor MG1. The target torque setting routine is executed at every 8 milliseconds by a timer interruption. When the program enters the target torque setting routine, the target drive torque STG of the first motor MG1 determined in the previous cycle of this routine is set to a calculated target torque TTG in this cycle of torque computation at step S100. At subsequent step S110, it is determined whether or not a flag FN is equal to one. The flag FN is set to one when a revolving speed Ne of the engine 150 has even once exceeded a predetermined value N1 (900 rpm in this embodiment) during the starting control process. The flag FN is reset to zero at a start of the stating control routine and is set by a revolving speed determination routine that is carried out by interruption and shown in the flowchart of FIG. 6. In the revolving speed determination routine of FIG. 6, the program first reads the revolving speed Ne of the engine 150 at step S112, and then determines whether or not the revolving speed Ne is greater than the predetermined value N1 at step S114. When Ne>N1, the flag FN is set to one at step S116. The flag FN is kept one until the starting control routine is started again. After the revolving speed Ne of the engine 150 has even once exceeded the predetermined value N1, the flag FN is kept one during the starting control process.

In the case where the flag FN is not equal to one at step S110, that is, when the revolving speed of the engine 150 has not even once exceeded the predetermined value N1 (900 rpm in this embodiment), the program continues the processing to cause the first motor MG1 to apply a torque to the crankshaft 156 of the engine 150 and drive the engine 150. It is then determined at step S120 whether or not the gearshift position SP read from the shift position sensor 184 is in a parking range. The processing of steps S120 through S128 sets a variation 'a' of the calculated target torque TTG of the first motor MG1 according to the conditions of the vehicle. When the gearshift position SP is in the parking range, the program determines that the engine 150 is started under the ceased condition of the vehicle, and sets 1 Nm to the variation 'a' of the drive torque of the first motor MG1 at step S122. When the gearshift position SP is other than the parking range, on the other hand, the program sets 3 Nm to the variation 'a' of the drive torque at step S124.

It is subsequently determined whether or not the revolving speed Ne of the engine 150 is not less than a predetermined value N2 (700 rpm in this embodiment) at step S126. When the revolving speed Ne of the engine 150 is not less than the predetermined value N2, the program determines that the revolving speed Ne of the engine 150 is higher than the range of possible torsional resonance and that the drive torque of the first motor MG1 can be reduced. The program accordingly sets −1.5 Nm to the variation 'a' at step S128. When the revolving speed Ne of the engine 150 is less than the predetermined value N2, on the other hand, the variation 'a' is not changed.

At subsequent step S130, the program adds the variation 'a' to the calculated target torque TTG of the first motor MG1 at step S130, and restricts the calculated target torque TTG in the range of 0 to a maximum value STGMAX of the drive torque at step S140. A concrete procedure sets the maximum value STGMAX to the calculated target torque TTG that is greater than the maximum value STGMAX, and sets zero to the calculated target torque TTG that is less than zero.

Figures 7, 8:
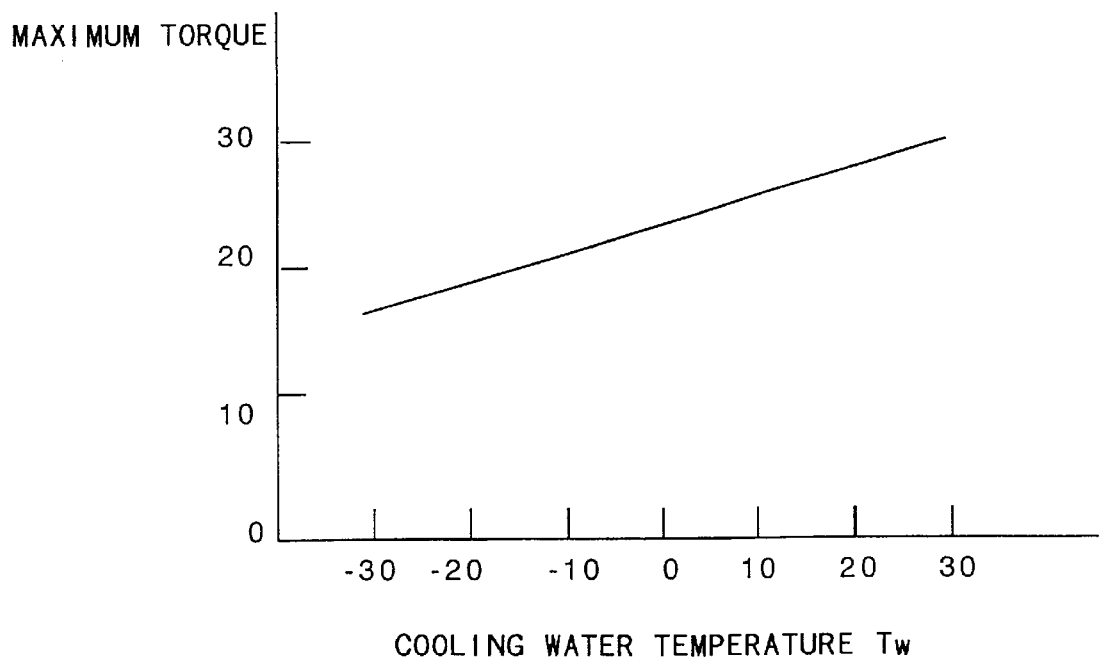
FIG. 7 is a table showing a relationship between the cooling water temperature Tw of the engine 150 and the maximum torque of the first motor MG1 at the time of starting the engine 150, which is used in the first embodiment.
FIG. 8 is a graph showing another available relationship between the cooling water temperature Tw and the maximum torque.

The maximum value STGMAX of the calculated target torque TTG of the first motor MG1 is set depending upon a cooling water temperature Tw of the engine 150. Although a concrete procedure of setting the maximum value STGMAX is omitted, this embodiment reads the maximum value STGMAX corresponding to the cooling water temperature Tw from the table shown in FIG. 7. For the simplicity of the setting, this embodiment divides the cooling water temperature Tw into five sections and sets the corresponding maximum value STGMAX. One possible modification minutely sets the maximum value STGMAX corresponding to the cooling water temperature Tw with the graph shown in FIG. 8. The typical procedure reads the cooling water temperature Tw from the water temperature sensor 174 at the start of the starting control process and sets the maximum value STGMAX.

The calculated target torque TTG of the first motor MG1 thus determined is set to the target value STG of the actual drive torque at step S150. The program then, exits from this routine. The main characteristics of this processing are that the target drive torque STG is not determined to compensate for a difference between the actual revolving speed and a target revolving speed and that the calculated target torque TTG is corrected with the variation 'a', which depends upon the gearshift position SP, and restricted in the range of 0 to the maximum value STGMAX. While there is a significant difference between the target revolving speed and the actual revolving speed at the time of starting the engine 150, a gradual increase in target drive torque STG and limitation of the target drive torque STG to the maximum value STGMAX, which depends upon the cooling water temperature Tw, effectively prevent the first motor MG1 from outputting the excessive drive torque and wasting the electric power of the battery 194.

Figure 9:
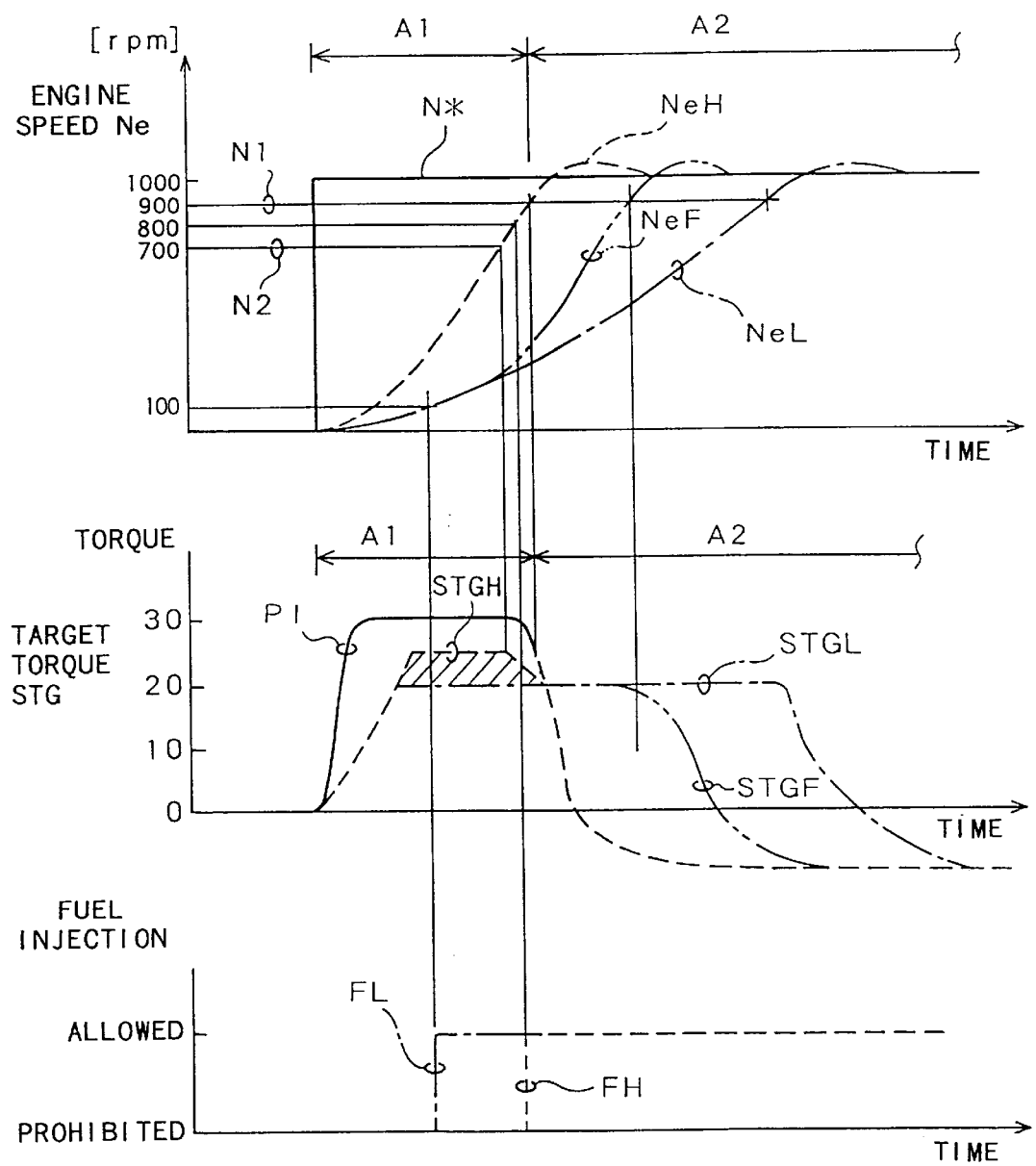
FIG. 9 is a graph showing the revolving speed Ne of the engine 150, the target torque STG, and permission and prohibition of fuel injection in the first embodiment.

FIG. 9 is a graph showing the revolving speed Ne and the target torque STG when the engine 150 is at ordinary temperature and when it is cold. At the time of starting the engine 150, the target revolving speed of the first motor MG1 is set equal to 1000 rpm. In the graph of FIG. 9, a broken curve NeH represents a variation in revolting speed Ne at the time of starting the engine 150 at ordinary temperature, whereas a curve of one-dot chain line NeL represents a variation in revolving speed Ne at the time of starting the engine 150 when it is cold. A broken curve STGH represents a variation in target torque STG of the first motor MG1 in the case where the engine 150 is at ordinary temperature, whereas a curve of one-dot chain line STGL represents a variation in target torque STG of the first motor MG1 in the case where the engine 150 is cold. In this embodiment, the target torque STG of the first motor MG1 is not set according to the difference in revolving speed, but is controlled to gradually increase by an open-loop control (hereinafter referred to as the ramp control). The curve of one-dot chain line STGL shows a variation in target torque STG when the fuel injection is not allowed up to 900 rpm. As described later, when the cooling water temperature Tw of the engine 150 is low, the fuel injection and ignition control are carried out at low revolving speed. The actual target torque of the first motor MG1 accordingly does not follow the curve of one-dot chain line STGL. This phenomenon will be discussed later in relation to the fuel injection control.

The repeated execution of the processing shown in the flowchart of FIG. 5 causes the target drive torque STG of the first motor MG1 to gradually increase irrespective of the gearshift position SP and to eventually reach and be kept at the maximum value STGMAX in a division A1 in the graph of FIG. 9. The smaller value is set to the maximum value STGMAX for the lower cooling water temperature Tw of the engine 150. The revolving speed Ne of the engine 150 gradually increases in the course of this control procedure. When the revolving speed Ne of the engine 150 exceeds the predetermined value N1 (900 rpm in this embodiment), the flag FN is set to one in the revolving speed determination routine shown in the flowchart of FIG. 6. This results in an affirmative answer at step S110 in the flowchart of FIG. 5. The program accordingly proceeds to step S160. While the processing of steps S120 through S140 determines the calculated target torque TTG of the first motor MG1 by the open-loop control, the processing of step S160 determines the calculated target torque TTG by the PI control. In a division A2 in the graph of FIG. 9, the program calculates a difference between the actual revolving speed Ne of the engine 150 and a target revolving speed N* and determines the calculated target drive torque TTG corresponding to the difference.

It is then determined at step S170 whether or not the calculated target torque TTG is smaller than the target drive torque STG currently used for the control. When the calculated target torque TTG is not smaller than the target torque STG previously specified, the drive torque of the first motor MG1 is increasing toward the target revolving speed. The program accordingly goes to step S150 and sets the calculated target torque obtained by the PI control is set to the target torque STG used for the control. When the calculated target torque TTG is smaller than the target torque STG, on the other hand, the calculated target torque TTG is subjected to a variation limiting process at step S180. When the revolving speed Ne of the engine 150 exceeds the predetermined value N1, the difference between the target revolving speed and the actual revolving speed decreases to zero, so that the calculated target torque TTG obtained by the PI control gradually decreases. This results in reducing the drive torque of the first motor MG1. The variation limiting process at step S180 prevents the drive torque from being lowered abruptly. While the vehicle is at a stop, the second motor MG2 is controlled to make the revolving speed of the drive shaft 112 equal to zero at step S30 in the flowchart of FIG. 4 and the engine 150 is driven with the power output from the first motor MG1. An abrupt decrease in output torque of the first motor MG1 in this state may cause a torque shock, although the output of the second motor MG2 is controlled to follow the decrease. This problem may arise when the vehicle is at a drive and the drive shaft 112 is rotated at a predetermined revolving speed. The variation limiting process for the calculated target torque TTG at step S180 prevents an abrupt change of the torque. The variation limiting process may be implemented by averaging the currently calculated target torque TTG and the target torque STG currently used for the control with specific weights, for example, as given below:

$$TTG \leftarrow (3 \times STG + TTG)/4.$$

As clearly shown in the graph of FIG. 9, the first motor MG1 is driven with the target drive torque set by the predetermined open-loop control until the revolving speed Ne of the engine 150 exceeds the predetermined value N1. When the revolving speed Ne exceeds the predetermined value N1, the target drive torque gradually decreases by the PI control. When the engine 150 is cold, the high viscosity of the lubricant causes the revolving speed not to quickly increase in response to application of the torque. As shown by the curve of one-dot chain line NeL in the graph of FIG. 9, a relatively long time is required to increase the revolving speed when the engine 150 is cold.

Figure 10:
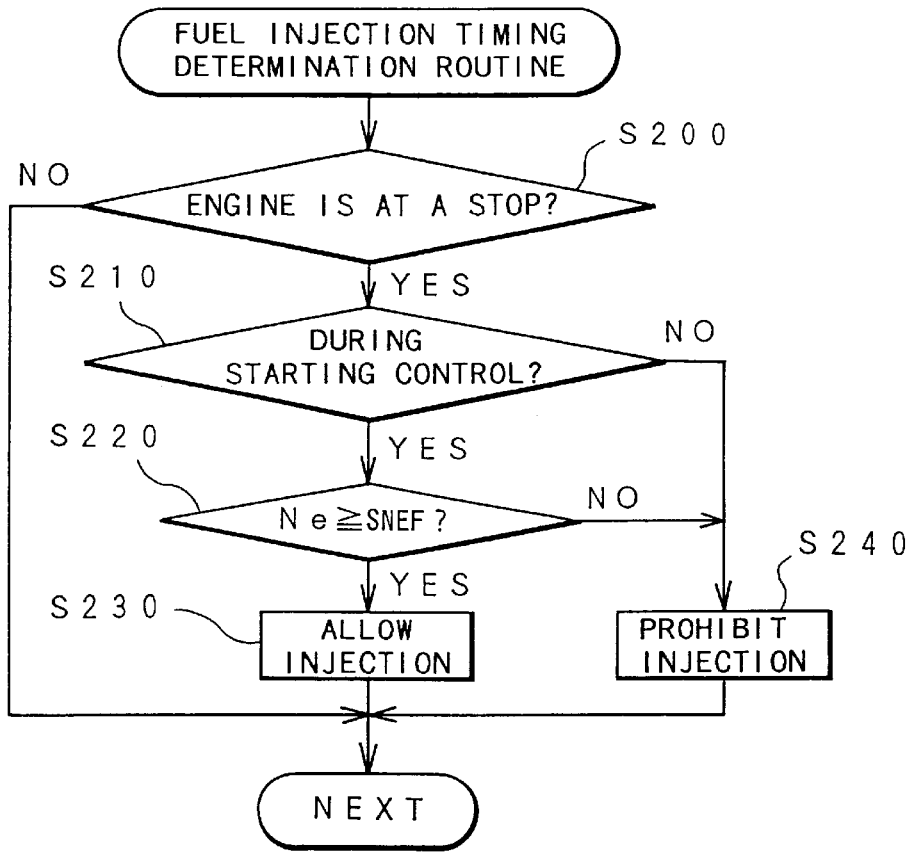
FIG. 10 is a flowchart showing a fuel injection timing determination routine.

At the time of starting the engine 150, the EFIECU 170 carries out the fuel injection and ignition control of the engine 150, accompanied with the control of the target drive torque. FIG. 10 is a flowchart showing a fuel injection timing determination routine executed by the controller 180. The controller 180 permits or prohibits the fuel injection and ignition control carried out by the EFIECU 170 at the time of starting the engine 150. The controller 180 transmits a permission or prohibition of the fuel injection and ignition control to the EFIECU 170 through communication. When the program enters the fuel injection timing determination routine, the controller 180 first determines whether the engine 150 is at a stop or being driven at step S200. When the engine 150 has been started and is being driven, the EFIECU 170 is in charge of the fuel injection and ignition timing control. The program thus directly exits from this routine. When the engine 150 has not been started yet, on the other hand, the controller 180 successively determines whether or not the starting control of the engine 150 is under way at step S210 and whether or not the revolving speed Ne is not less than an injection-allowable revolving speed SNEF at step S220. When the answer is negative at either one of steps S210 and S220, the controller 180 determines that the engine 150 has not yet been in the state that allows fuel injection and ignition to the air/fuel mixture and thereby outputs a signal for prohibiting fuel injection to the EFIECU 170 at step S230. When the answer is affirmative at both steps S210 and S220, that is, when the starting control of the engine 150 is under way and the revolving speed Ne is not less than the injection-allowable revolving speed SNEF, on the other hand, the controller 180 determines that the engine 150 has already been in the state that allows fuel injection and ignition to the air/fuel mixture and thereby outputs a signal for permitting the fuel injection to the EFIECU 170 at step S240. The EFIECU 170 starts the fuel injection and ignition timing control in response to this permit signal. The actual procedure measures the rotational angle of the crankshaft 156 of the engine 150 and carries out the fuel injection and output of an ignition signal to the air/fuel mixture at a desired timing.

Figures 11, 12:
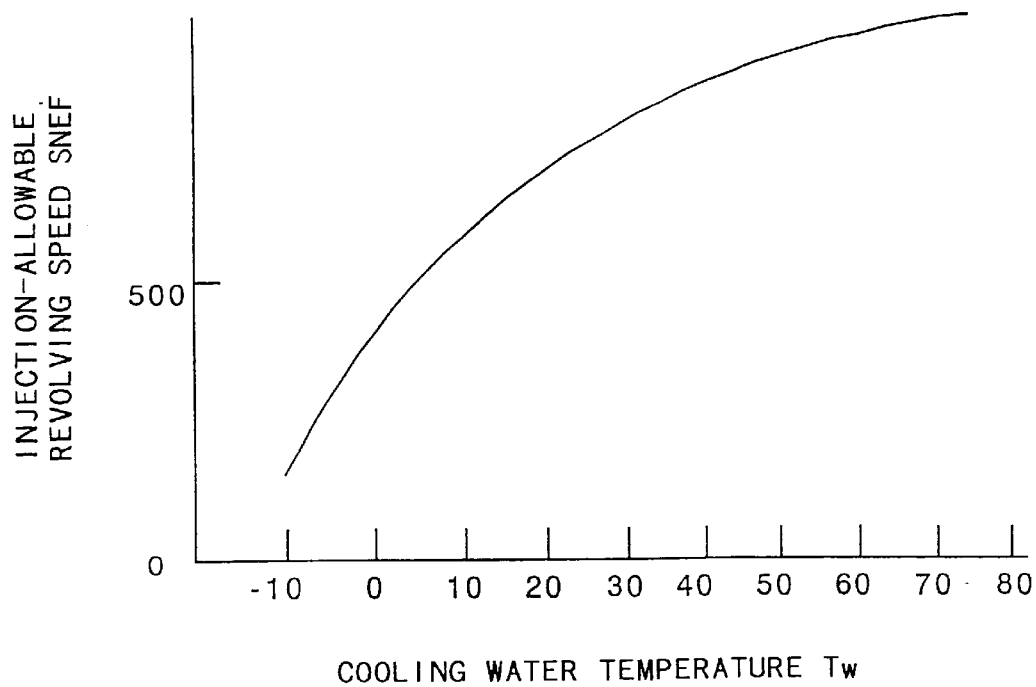
FIG. 11 is a table showing a relationship between the cooling water temperature Tw of the engine 140 and the injection-allowable revolving speed SNEF, which is used in the first embodiment.
FIG. 12 is a graph showing another available relationship between the cooling water temperature Tw and the injection-allowable revolving speed SNEF.

The injection-allowable revolving speed SNEF, which is compared with the revolving speed Ne of the engine 150 at step S220, is set depending upon the cooling water temperature Tw of the engine 150. In this embodiment, the injection-allowable revolving speed SNEF is set equal to 800 rpm when the cooling water temperature Tw is not lower than 80° C. as shown in the table of FIG. 11. The lower injection-allowable revolving speed SNEF is set for the lower cooling water temperature Tw. For the simplicity of the setting, this embodiment divides the cooling water temperature Tw into four sections and sets the corresponding injection-allowable revolving speed SNEF. One possible modification minutely sets the injection-allowable revolving speed SNEF corresponding to the cooling water temperature Tw with the graph shown in FIG. 12.

Such control enables the fuel injection to start at the lower revolving speed under the condition of the lower cooling water temperature Tw as shown by a curve of one-dot chain line FL in the bottom of FIG. 9. As shown by a broken curve FH in the graph of FIG. 9, when the engine 150 is rotated at the revolving speed of not lower than 800 rpm, the fuel injection and ignition control causes immediate combustion of the air/fuel mixture and enables the engine 150 to be driven at an idle. This results in extremely favorable emissions. In order to attain the favorable emissions, it is preferable to set the greater value to the revolving speed at which the fuel injection starts. A relatively long time period may be required to increase the revolving speed when the engine 150 is completely cooled down. In this case, the electric power consumed by the first motor MG1 tends to be excessive while the increase in revolving speed Ne of the engine 150 is waited. The structure of the embodiment allows the EFIECU 170 to carry out the fuel injection control at a lower revolving speed when the cooling water temperature Tw of the engine 150 is low and the engine 150 is completely cooled down. After the engine 150 has been cranked by the first motor MG1 for a certain time period, the fuel injection and ignition control starts at a low revolving speed to cause the immediate combustion of the air/fuel mixture and enable the engine 150 to start self rotation. This structure effectively prevents the excessive electric power from being wasted for cranking. As mentioned above, the curves of the one-dot chain line NeL and STGL show the case in which the start of fuel injection is allowed at the revolving speed of 800 rpm. As shown by curves of two-dot chain line NeF and STGF in the graph of FIG. 9, the processing of FIG. 10 enables the revolving speed of the engine 150 to be quickly increased by the fuel injection and the accompanied self rotation of the engine 150, thereby causing the required torque of the first motor MG1 to abruptly decrease. This structure effectively prevents the first motor MG1 from being driven over a long time period and wasting the power of the battery 194.

Once the engine 150 has started, the cooling water temperature Tw of the engine 150 increases. In the case where the engine 150 is stopped during a drive and then restarted, the fuel injection is allowed after the first motor MG1 drives the engine 150 to the ordinary revolving speed (for example, 800 rpm). Once the engine 150 is started, the emission at the subsequent re-start of the engine 150 is kept in the extremely favorable state.

Figure 13:
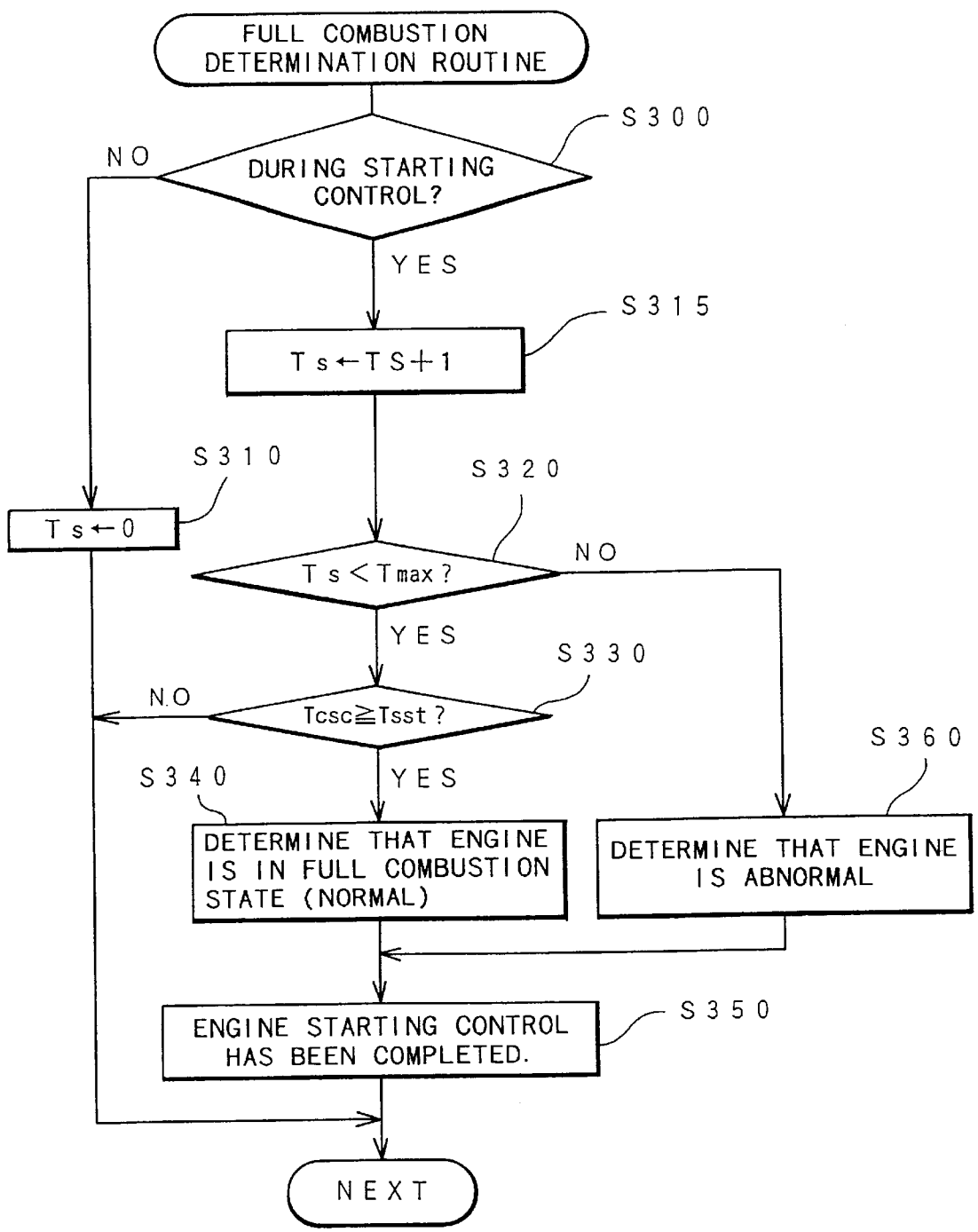
FIG. 13 is a flowchart showing a full combustion determination routine that determines whether or not the engine 150 is in the full combustion state.

In addition to the above control processes, the structure of this embodiment further carries out a full combustion determination routine shown in the flowchart of FIG. 13. When the program enters this routine, it is first determined at step S300 whether or not the starting control is under way. When the starting control is not under way, a timer Ts that sets a time period for determining the full combustion is reset to zero at step S310. The program then goes to NEXT and exits from this routine. The timer Ts is realized by a variable that is counted up in the full combustion determination routine as discussed later. A self-propelled timer incorporated in the controller 180 may be applied for the timer Ts. The self-propelled timer counts the time immediately after each reset and enables the CPU to read the value of the timer as the elapse of time Ts.

Figure 14:
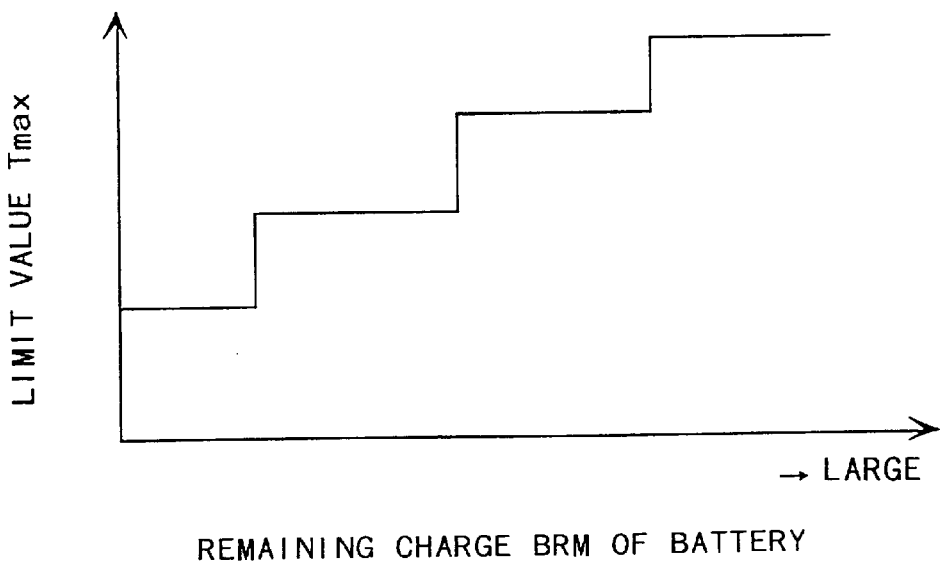
FIG. 14 is a map showing the limit value Tmax plotted against the remaining charge BRM of the battery 194.

When it is determined that the starting control is under way at step S300, on the other hand, the program increments the timer Ts by one at step S315 and compares the timer Ts with a preset limit value Tmax at step S320. The limit value Tmax is set according to the remaining charge BRM of the battery 194 as shown in the graph of FIG. 14. The limit value Tmax increases with an increase in remaining charge BRM of the battery 194. This means that the time period for determining the full combustion is lengthened with an increase in remaining charge BRM of the battery 194. In this embodiment, the limit value Tmax, which is compared with the timer Ts, is set equal to approximately 10 seconds when the remaining charge BRM of the battery 194 is 50%. The first motor MG1 is thus not continuously driven over 10 seconds at the time of starting the engine 150, in the case where the remaining charge BRM of the battery 194 is equal to 50%.

Figure 15:
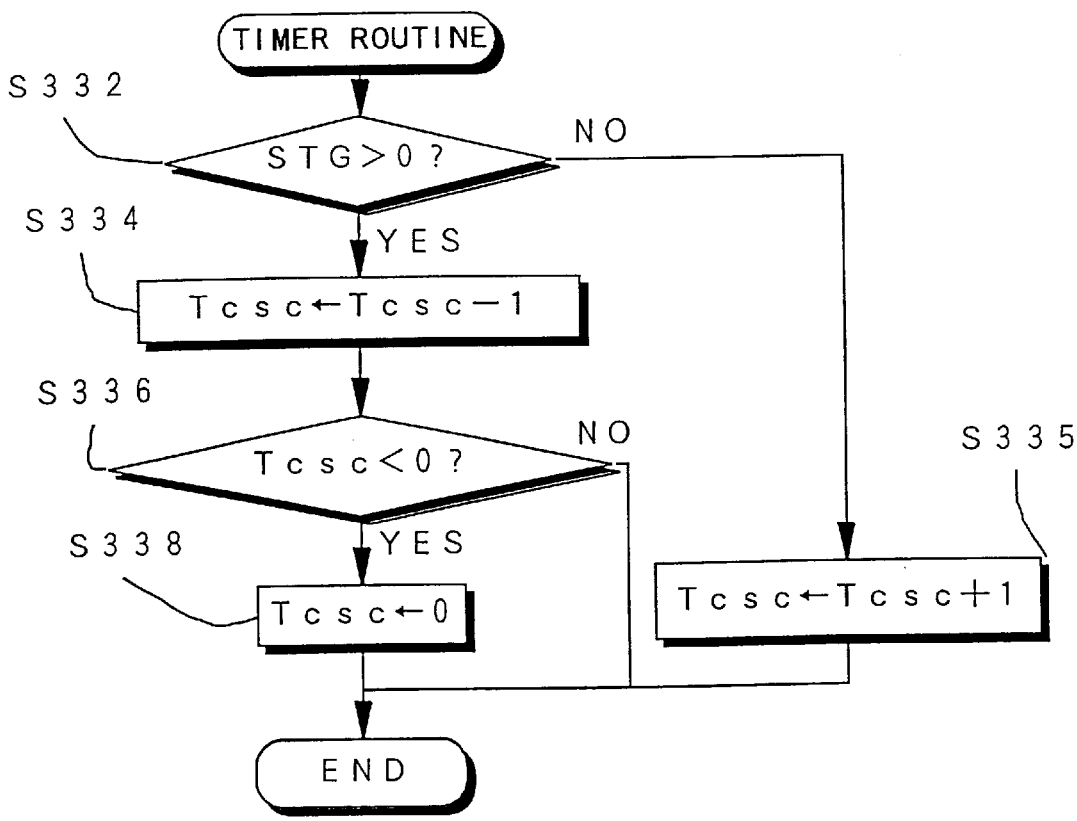
FIG. 15 is a flowchart showing a timer routine for counting a timer Tcsc.

Immediately after the start of the stating control operation, the timer Ts is less than the limit value Tmax. The answer is accordingly affirmative at step S320 until the limit value Tmax has elapsed since the start of the starting control operation. In this case, at subsequent step S330, another timer Tcsc is compared with a preset value Tsst. The timer Tcsc is set in an interruption routine shown in the flowchart of FIG. 15 and is reset to zero at the start of the starting control operation. When the target torque STG of the first motor MG1 has a positive value, that is, when STG>0, at step S332, the timer Tcsc is decremented by one at step S334. When the timer Tcsc is less than zero at step S336, the timer Tcsc is set to zero at step S338. The positive target torque STG implies the state in which the engine 150 is externally driven by the first motor MG1. When the engine 150 is self driven through the combustion of the air/fuel mixture, the first motor MG1 is not required to continue driving the engine 150, and the target torque STG becomes equal to or less than zero. When the target torque STG of the first motor MG1 is not greater than zero, the timer Tcsc is incremented by one at step S335 every time when the interruption routine of FIG. 15 is activated. In this routine, when the target torque STG exceeds zero, the timer Tcsc is not uniformly reset to zero but decremented by one. This is ascribed to the presence of the case, in which the engine 150 is close to the state of full combustion but occasionally requires the torque output from the first motor MG1. In this case, the target torque STG fluctuates about zero to have a positive value and a negative value. The continuous variation of the timer Tcsc enables the stable driving state of the engine 150 to be readily detected. Another possible procedure immediately resets the timer Tcsc to zero when the target torque STG of the first motor MG1 exceeds zero, and determines the state of full combustion based on the time period for which the target torque STG is continuously equal to or below zero.

The value of the timer Tcsc is varied according to the target torque STG in the manner described above. When the engine 150 falls into the state of full combustion, the value of the timer Tcsc eventually reaches or exceeds the preset value Tsst at step S330. The preset value Tsst is specified corresponding to the cooling water temperature Tw of the engine 150 as shown in the table of FIG. 16. This embodiment divides the cooling water temperature Tw into three sections, and sets a longer time period corresponding to a lower cooling water temperature (5 seconds at the temperatures of not higher than −10° C.) and an extremely short time period when the engine 150 is sufficiently warmed (0.3 seconds at the temperatures of not lower than 80° C.). When the engine 150 is cold, the decision of step 5330 changes to the affirmative 5 seconds after the target torque STG of the first motor MG1 has become equal to or less than zero. When the engine 150 is sufficiently warmed, on the other hand, the decision of step S330 immediately gives the affirmative answer.

The program does not perform any processing but goes to NEXT and exits from this routine, until the preset time Tsst has elapsed since the target torque STG of the first motor MG1 became equal to or less than zero. When the preset time Tsst has elapsed since the target torque STG of the first motor MG1 became equal to or less than zero, the program determines that the engine 150 is in the state of full combustion at step S340 and concludes the engine starting control at step S350. When the timer Ts becomes equal to or greater than the limit value Tmax at step S320 before the preset time Tsst has elapsed since the target torque STG of the first motor MG1 became equal to or less than zero, it is determined that the engine 150 can not fall into the state of full combustion within the preset time. The program accordingly determines that there is any cause to prevent a start of the engine 150 at step S360 and concludes the engine starting control at step S350 before going to NEXT and exiting from this routine.

In the process of cranking and starting the engine 150 by the first motor MG1, in the case where any abnormality occurs in the engine 150 and prevents the engine 150 from falling into the state of full combustion, the cranking time is restricted to the limit value Tmax, which depends upon the remaining charge BRM of the battery 194. This structure effectively prevents the first motor MG1 from being driven over a long time period and wasting the electric power of the battery 194. When the engine 150 does not fall into the state of full combustion, the structure of the embodiment cuts off the supply of electricity to the first motor MG1 when the time period corresponding to the limit value Tmax has elapsed. When the driver returns the starter switch 179 and resets the ignition key to the start position, the starting control starts all over again. In this case, the number of repetitions of the starting control may be restricted according to the remaining charge BRM of the battery 194. When the electric power stored in the battery 194 is not less than a specified level, the hybrid vehicle drives the second motor MG2 with this remaining electric power to drive the drive shaft 112 and make the vehicle run a certain distance. In some cases, it is accordingly preferable that further repetition of the starting control is prohibited before the remaining charge BRM of the battery 194 becomes less than the specified level. This enables the vehicle to run to a garage with the residual electric power in the battery 194 (limp home).

The following gives the summary of the starting control operation of the embodiment described above.

(1) In this embodiment, at the time of starting the engine 150, the first motor MG1 outputs the required torque for enabling the revolving speed Ne of the engine 150 to quickly pass through the revolving speed range in which torsional resonance easily occurs. This embodiment does not apply the torque corresponding to the difference between the actual revolving speed and the target revolving speed of the engine 150 from the first motor MG1 to the engine 150, but carries out the ramp control to cause the torque for driving the engine 150 to increase at a fixed ratio per predetermined time period (1 Nm or 3 Nm per 8 milliseconds in this embodiment). This structure does not cause torsional resonance but still effectively prevents the first motor MG1 from outputting the unnecessarily large torque and wasting the electric power of the battery 194 immediately after the start of the engine 150. Compared with the conventional structure that specifies the target torque based on the difference between the target revolving speed N* and the actual revolving speed Ne, the structure of the embodiment saves the energy corresponding to the area defined by a solid curve PI and the broken curve STGH in the graph of FIG. 9.

(2) The maximum value STGMAX of the drive torque applied from the first motor MG1 to the crankshaft 156 of the engine 150 is adjusted according to the cooling water temperature Tw of the engine 150. In the case where application of the torque from the first motor MG1 does not quickly increase the revolving speed Ne of the engine 150, for example, when the engine 150 is cold, this structure effectively prevents the first motor MG1 from outputting the excessive torque and wasting the electric power of the battery 194. This structure, also reduces the heat of the first motor MG1. When the engine 150 is completely cooled down and the output of the torque from the first motor MG1 only slowly increases the revolving speed of the engine 150, this structure saves the energy corresponding to the hatched area defined by the broken curve STGH and the curve of one-dot chain line STGL in the graph of FIG. 9.

(3) The structure of the embodiment changes the injection-allowable revolving speed SNEF, at which the start of fuel injection is allowed, according to the cooling water temperature Tw of the engine 150. When the engine 150 is cold, the fuel injection and ignition control starts at a lower revolving speed, and the engine 150 starts at an earlier timing 5 through the combustion of the air/fuel mixture. This arrangement effectively prevents the electric power of the battery 194 from being wastefully consumed.

(4) In this embodiment, when the revolving speed Ne of the engine 150 exceeds the predetermined value N1, the method of controlling the drive torque of the first motor MG1 is changed from the ramp control described in (1) to the PI control according to the revolving speed Ne of the engine 150. When the engine 150 falls into the state of full combustion, the revolving speed Ne of the engine 150 smoothly shifts to the target revolving speed. In the case where the self drive of the engine 150 causes some decrease in revolving speed, the power output from the first motor MG1 supplements the insufficiency corresponding to the difference from the target revolving speed and thereby preventing the engine 150 from stalling.

(5) When the revolving speed Ne of the engine 150 exceeds the predetermined value N1, the drive torque of the first motor MG1 is gradually decreased. The embodiment carries out the variation limiting process with respect to the target torque STG. This arrangement effectively prevents the drive torque of the first motor MG1 from decreasing abruptly, thereby preventing the occurrence of a torque shock.

(6) This embodiment varies the preset time Tsst for determining the full combustion of the engine 150 according to the cooling water temperature Tw of the engine 150. When the engine 150 is cold, a sufficient time is used for the full combustion determination before conclusion of the starting control. This arrangement prevents the engine 150 from stalling due to the early conclusion of the starting control when the engine 150 is in the cold.

(7) The structure of the embodiment sets the open-close timing of the air intake valve 152 to the lag-most angle, prior to the starting control (see step S20 in the flowchart of FIG. 4). This minimizes the loading applied when the first motor MG1 cranks the engine 150, and enables the first motor MG1 to quickly increase the revolving speed of the engine 150. This arrangement enables the revolving speed of the engine 150 to quickly pass through the range of possible torsional resonance.

Figure 17:
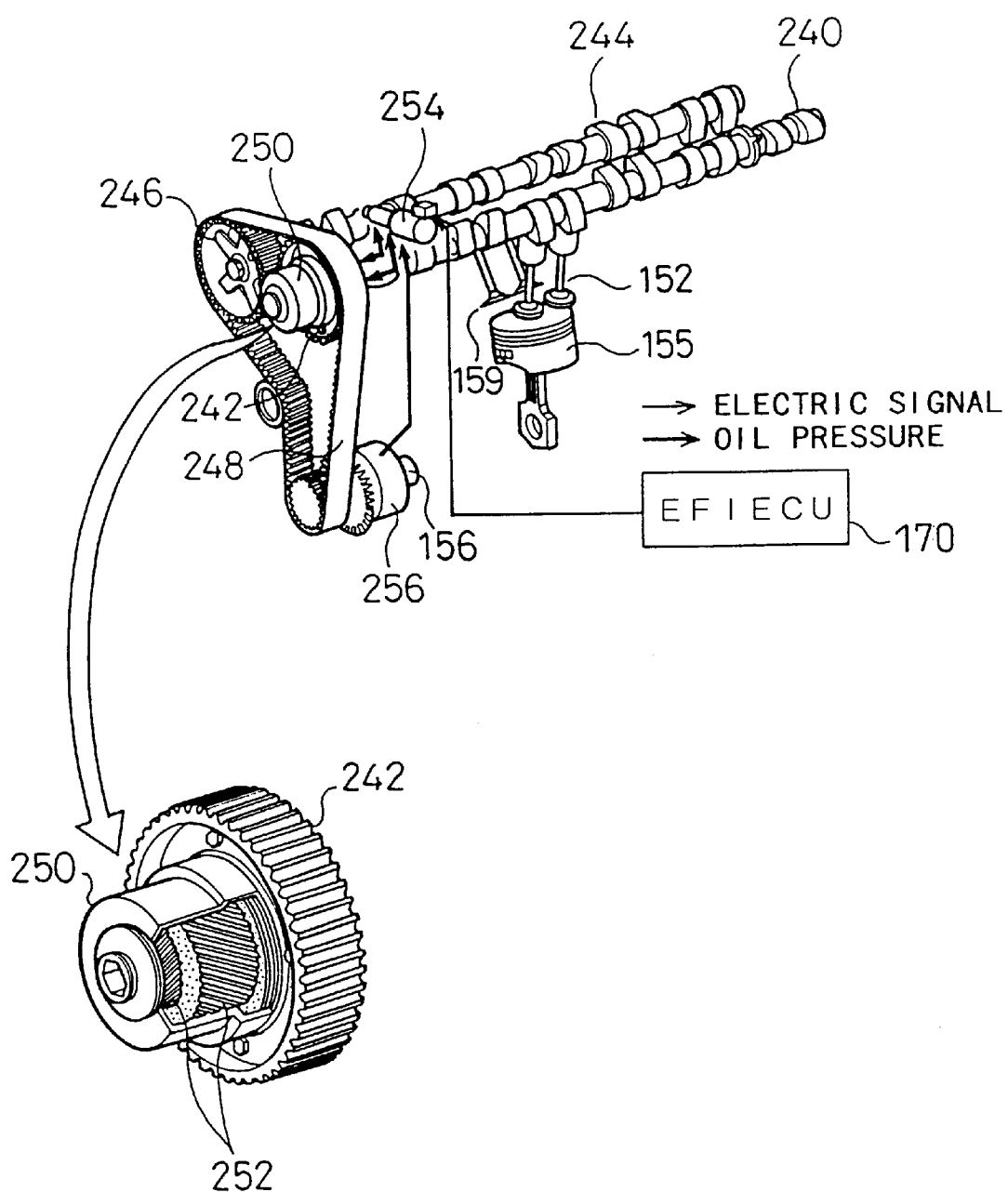
FIG. 17 illustrates a valve overlap variable mechanism adopted in the first embodiment.

This embodiment applies a continuous variable valve timing (hereinafter referred to as VVT) mechanism for the mechanism that changes the valve timing as described in (7). FIG. 17 illustrates this VVT mechanism. The air intake valve 152 is generally opened and closed by a cam attached to an intake cam shaft 240, whereas an exhaust valve 159 is opened and closed by a cam attached to an exhaust cam shaft 244. An intake cam shaft timing gear 242 connecting with the intake cam shaft 240 and an exhaust cam shaft timing gear 246 connecting with the exhaust cam shaft 244 are linked with the crankshaft 156 via a timing belt 248, in order to enable the air intake valve 152 and the exhaust valve 159 to be opened and closed at a timing corresponding to the revolving speed of the engine 150. In addition to this conventional structure, in the VVT mechanism, the intake cam shaft timing gear 242 and the intake cam shaft 240 are connected with each other via an oil hydraulic VVT pulley 250. The VVT pulley 250 is provided with an OCV 254, which is a control valve of the input oil pressure. The VVT pulley 250 includes a combination of variable pistons 252 that are movable along the axis by the oil pressure. The oil pressure is supplied from an engine oil pump 256 to the VVT pulley 250.

The following describes the operation principle of the VVT mechanism. The EFIECU 170 determines the open-close timing of the air intake valve 152 according to the driving condition of the engine 150, and outputs a control signal to control the on-off operation of the OCV 254. The oil pressure input into the VVT pulley 250 varies in response to the control signal and thereby moves the variable pistons 252 along the axis. The variable pistons 252 have threads formed obliquely relative to the axis, which cause rotation of the variable pistons 252 with the movement along the axis. The rotation varies the angle of the intake cam shaft 240 and the intake cam shaft timing gear 242 linked with the variable pistons 252. This results in varying the open-close timing of the air intake valve 152 and thereby changing the valve overlap. In this embodiment, the VVT pulley 250 is provided only for the intake cam shaft 240 and not for the exhaust cam shaft 244, so that the valve overlap is controlled by regulating the open-close timing of the air intake valve 152.

The starting control of the engine 150 utilizes this VVT mechanism and causes the EFIECU 170 to set the open-close timing of the air intake valve 152 to the lag-most angle and thereby increase the valve overlap. This reduces the loading (pumping work) of the engine 150 seen from the first motor MG1.

Although this embodiment applies the VVT mechanism, the mechanism that changes the valve overlap is not restricted to the VVT mechanism. One available mechanism, for example, applies oil hydraulic valves that do not use the cam but directly open and close in response to the oil pressure for the air intake valve 152 and the exhaust valve 159 and regulates the oil hydraulic valves to change the valve overlap.

Although not being described in detail in the above embodiment, the open-close timing of the air intake valve 152, which is set to the lag-most angle prior to the starting control, is regulated in response to a control requirement of the EFIECU 170 after the revolving speed Ne of the engine 150 passes through the range of possible torsional resonance.

The following describes a second embodiment according to the present invention. The second embodiment carries out a control procedure that is fundamentally similar to that of the first embodiment. The difference from the first embodiment is that the limit value Tmax of the time period for the full combustion determination is corrected based on the cooling water temperature Tw of the engine 150. In the first embodiment described above, the preset time Tsst for the full combustion determination is lengthened for the lower cooling water temperature Tw of the engine 150 as shown in the table of FIG. 16. This prevents the engine 150 in the cold from stalling. The maximum time Tmax for cranking the engine 150 by the first motor MG1 depends upon the remaining charge BRM of the battery 194 but is independent of the cooling water temperature Tw.

The starting control apparatus for the internal combustion engine in the second embodiment, on the other hand, stores a map representing a relationship between a correction coefficient kw and the cooling water temperature Tw of the engine 150 as shown in the graph of FIG. 18. In the full combustion determination routine shown in the flowchart of FIG. 13, the second embodiment reads the correction efficient kw corresponding to the observed cooling water temperature Tw of the engine 150 from this map and corrects the limit value Tmax with the correction efficient kw as Tmax←kwTmax at step S318, prior to the determination of the time elapse at step S320 as shown in the flowchart of FIG. 19. The maximum time Tmax of the time period for the full combustion determination is accordingly set longer for the lower cooling water temperature Tw of the engine 150, that is, the poorer startability of the engine 150. The engine 150 is cranked for a longer time period when the engine 150 is cold than that when the engine 150 is at ordinary temperature. This arrangement improves the startability of the engine 150 cold.

Figure 20:
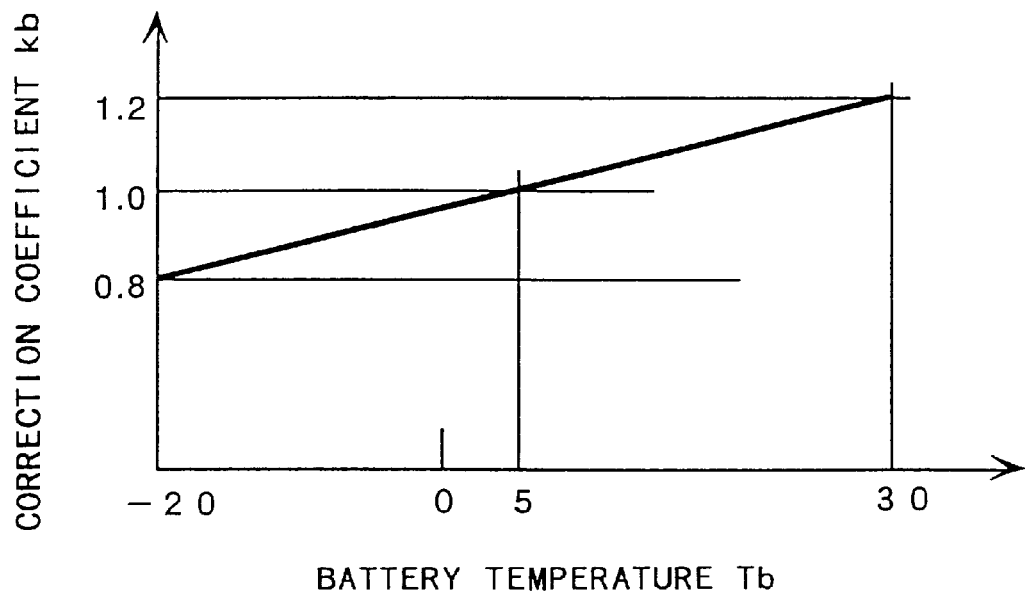
FIG. 20 is a graph showing a relationship between the battery temperature Tb and the correction coefficient kb, which is used in a modification of the second embodiment.

One preferable modification of the second embodiment measures the temperature Tb of the battery 194 with the battery temperature sensor 193 and corrects the remaining charge BRM of the battery 194 based on the observed battery temperature Tb. In general, the remaining charge BRM of the battery 194 represents the amount of suppliable electric power. The remaining charge BRM is computed by the software through the charge and discharge of the battery 194. The temperature Tb of the battery 194 is regarded as constant for the computation of the remaining charge BRM. At the time of starting the engine 150, however, the battery 194 may be completely cooled down and the calculated remaining charge BRM may be deviated from the amount of suppliable electric power at the time of starting the engine 150. The modified structure accordingly measures the battery temperature Tb and corrects the remaining charge BRM of the battery 194 based on the observed battery temperature Tb, so as to cause the limit value Tmax to be varied according to the amount of the suppliable electric power. FIG. 20 shows a map representing the relationship between the battery temperature Tb and a correction coefficient kb. Like the second embodiment, this modified structure reads the correction coefficient kb from this map and corrects the remaining charge BRM with the correction coefficient kb as BRM←kb·BRM. The limit value Tmax, which depends upon the remaining charge BRM of the battery 194 as shown in the graph of FIG. 14, is accordingly corrected based on the battery temperature Tb.

This modified structure corrects the remaining charge BRM of the battery 194 based on the temperature Tb of the battery 194 and thus enables the electric power that is suppliable from the battery 194 to be accurately estimated. When the remaining charge BRM of the battery 194 is expected to be sufficient, the first motor MG1 can be driven over a relatively long time period, which assures the accurate full combustion determination. This arrangement prevents cranking of the engine 150 from being stopped uniformly irrespective of the surplus remaining charge BRM of the battery 194 and ensures the appropriate starting control of the engine 150. This structure accordingly prevents the waste of electric power.

This modified structure directly measures the temperature Tb of the battery 194 with the battery temperature sensor 193. The temperature Tb of the battery 194 under the ceased condition of the vehicle may be estimated from the cooling water temperature Tw of the engine 150. In this case, the correction coefficient kb is determined corresponding to the cooling water temperature Tw of the engine 150. According to the experimental measurement, when the vehicle was left overnight outdoors at the temperature of about −25° C., the temperature Tb of the battery 194 was approximately −15° C. whereas the cooling water temperature Tw of the engine 150 was lowered to −25° C. In the case where the cooling water temperature Tw of the engine 150 replaces the temperature Tb of the battery 194, it is preferable that the cooling water temperature Tw is corrected to a little higher value.

As clearly understood from this experimental measurement, when the energy suppliable from the battery 194 at the temperature of −25° C. is greater than the energy required for starting the engine 150 at the temperature of −25° C. (that is, the integrated power consumption of the first motor MG1), the engine 150 can be started even in the cold as −25° C. The remaining charge BRM of the battery 194 under the ceased condition of the vehicle should thus be regulated to satisfy this condition. Even when the engine 150 is completely cooled down, the temperature of the battery 194 is not as low as the temperature of the engine 150 as shown by the experimental measurement. The suppliable energy from the battery 194 increases with an increase in temperature, and the required energy for starting the engine 150 decreases with an increase in temperature. The energy difference corresponding to the temperature difference is accordingly the surplus energy of the battery 194 at the time of starting the engine 150.

Figure 21:
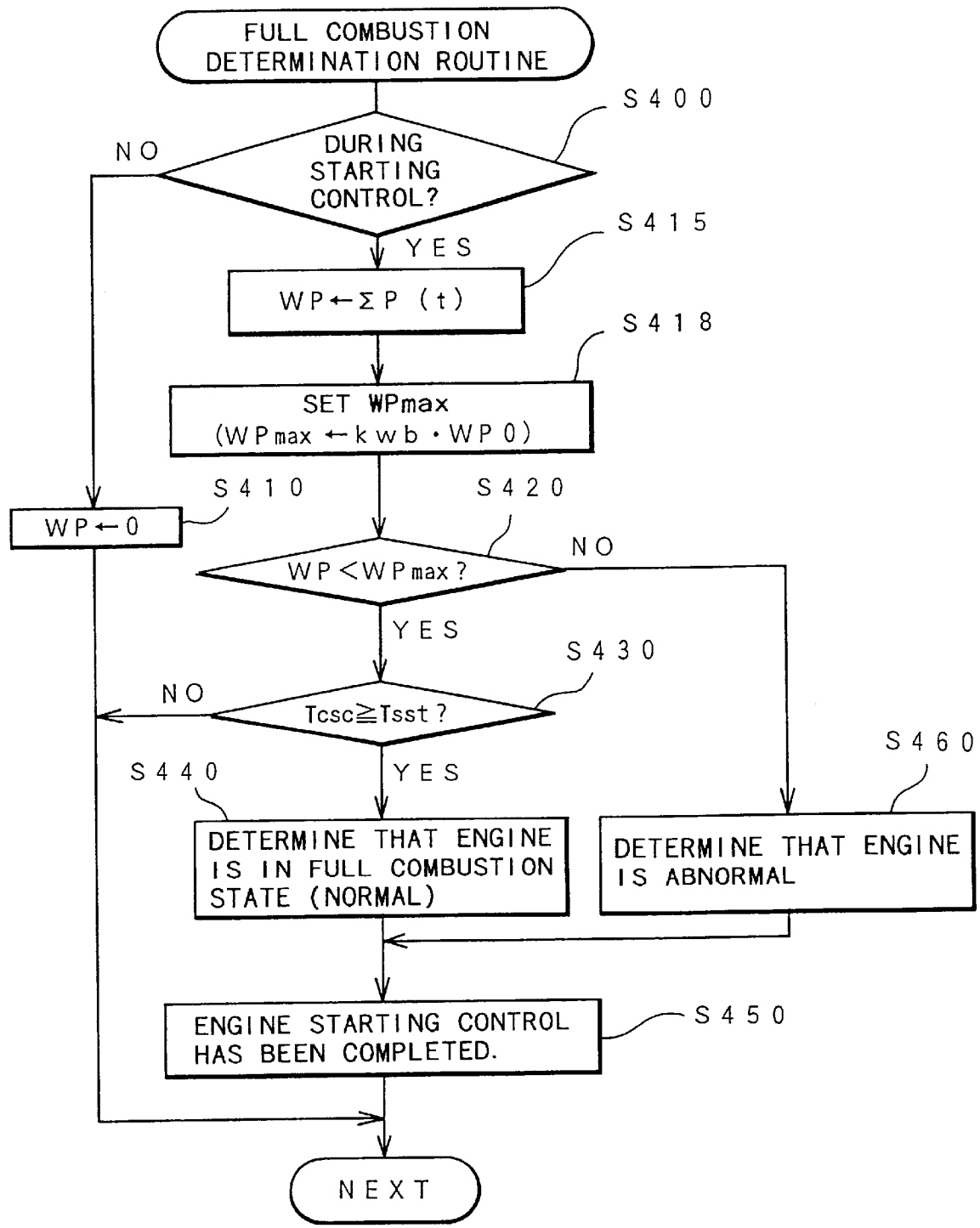
FIG. 21 is a flowchart showing a full combustion determination routine executed in a third embodiment according to the present invention.

The following describes a third embodiment according to the present invention. The starting control apparatus for the internal combustion engine in the third embodiment has the same hardware structure as that of the first embodiment. The difference from the first embodiment is the method of determining the cranking time at the time of starting the engine 150. FIG. 21 is a flowchart showing a full combustion determination routine carried out in the third embodiment. The program first determines whether or not the starting control is under way at step S400 like the first embodiment shown in FIG. 13. When it is determined that the starting control is not under way at step S400, an integrated amount of electric power WP representing the integrated amount of electric power taken out of the battery 194 for starting the engine 150 is reset to zero at step S410.

When it is determined that the starting control is under way at step S400, on the other hand, the program integrates a power consumption P(t) of the battery 194 since the start of the starting control operation and sets the integrated power consumption P(t) to the integrated amount of electric power WP at step S415. The power consumption P(t) of the battery 194 is obtained as the product of the voltage of the battery 194 and the electric currents measured with the ammeters 195 and 196. The voltage of the battery 194 is regarded as constant. The full combustion determination routine is executed at predetermined time intervals. A simple procedure accordingly measures the electric current flowing from the battery 194 to the first motor MG1 and integrates the observed electric current. Another possible procedure utilizes a hardware structure to detect the integrated power consumption P(t) by the first motor MG1 since the start of the starting control operation.

Figure 22:
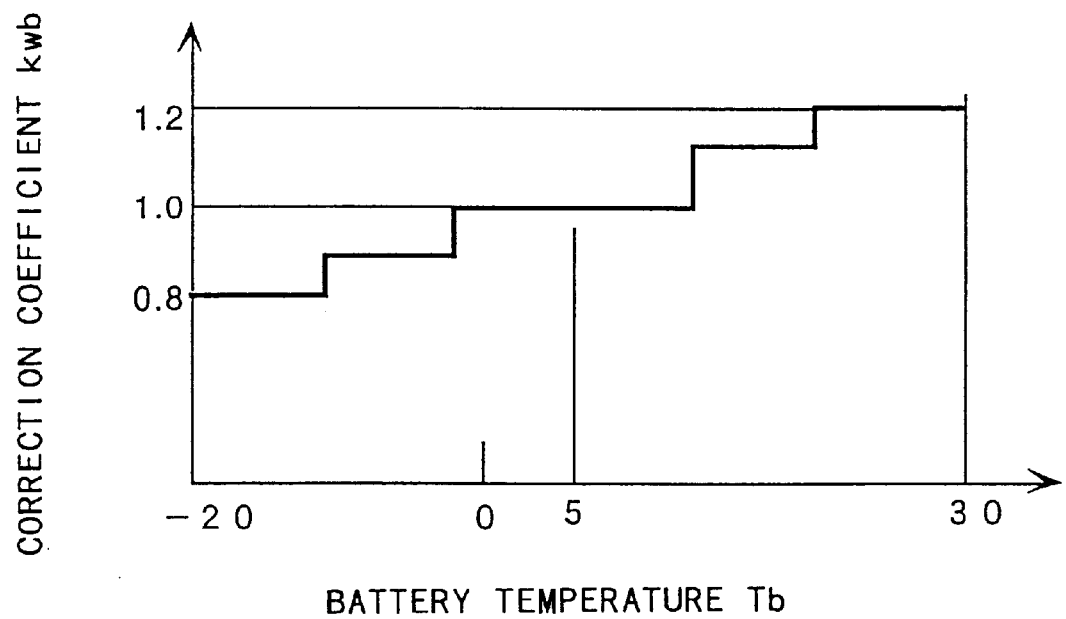
FIG. 22 is a graph showing a relationship between the battery temperature Tb and the correction coefficient kwb, which is used in the third embodiment.

The program subsequently sets an upper limit WPmax by multiplying a preset value WP0 by a correction coefficient kwb at step S418. The correction coefficient kwb is read corresponding to the battery temperature Tb measured with the battery temperature sensor 193, for example, from a map shown in FIG. 22. The correction coefficient kwb has a positive correlation with the battery temperature Tb as shown in FIG. 22, so that the smaller value (<1) is set to the correction coefficient kwb at the lower battery temperature Tb.

The integrated amount of electric power WP, which is the summation of the power consumption P(t), is then compared with the upper limit WPmax at step S420. Immediately after the start of the starting control operation, the integrated amount of electric power WP is small and the decision of step S420 gives the affirmative answer. In this case, the program determines whether or not the timer Tcsc is not less than the preset value Tsst at step S430 in the same manner as step S330 of the first embodiment. The timer Tcsc is set according to the routine of FIG. 15 as described previously. The timer Tcsc starts increasing when the target torque STG of the first motor MG1 becomes equal to or less than zero, that is, when the engine 150 starts self driving. When the engine 150 falls into the state of full combustion, the timer Tcsc becomes not less than the preset value Tsst at step S430.

Like the full combustion determination routine of the first embodiment shown in FIG. 13, in the full combustion determination routine of the third embodiment, the program does not perform any processing but goes to NEXT and exits from this routine, until the preset time Tsst has elapsed since the target torque STG of the first motor MG1 became equal to or less than zero. When the preset time Tsst has elapsed since the target torque STG of the first motor MG1 became equal to or less than zero, the program determines that the engine 150 is in the state of full combustion at step S440 and concludes the engine starting control at step S450. When the integrated amount of electric power WP reaches or exceeds the upper limit WPmax at step S420 before the preset time Tsst has elapsed since the target torque STG of the first motor MG1 became equal to or less than zero, it is determined that the engine 150 can not fall into the state of full combustion within the preset time, which is allowable based on the power consumption of the battery 194. The program accordingly determines that there is any cause to prevent a start of the engine 150 at step S460 and concludes the engine starting control at step S450 before going to NEXT and exiting from this routine.

In the process of cranking and starting the engine 150 by the first motor MG1, in the case where any abnormality occurs in the engine 150 and prevents the engine 150 from falling into the state of full combustion, the cranking time is restricted to prevent the integrated amount of electric power WP of the battery 194 from exceeding the upper limit WPmax. This structure effectively prevents the first motor MG1 from being driven over a long time period and wasting the electric power of the battery 194. The third embodiment carries out the same control as that of the first embodiment except this full combustion determination and thereby has the effects of (1) through (7) described in the first embodiment.

The third embodiment does not specifically take into account the remaining charge BRM of the battery 194 to set the upper limit WPmax. In the hybrid vehicle of this embodiment, the charge and discharge of the battery 194 is controlled to keep the remaining charge BRM of the battery 194 within a certain range during a run. The starting control is thus performed on the assumption that the remaining charge BRM of the battery 194 is within the certain range at the time of starting the engine 150. One possible modification measures the remaining charge BRM of the battery 194 and sets the upper limit WPmax based on the observed remaining charge BRM.

The starting control of the engine 150 is described in the first through the third embodiments. In the hybrid vehicle, it is advantageous that the full combustion of the engine 150 is determined according to the value of the target torque STG of the first motor MG1 that is linked with the engine 150 and cranks the engine 150. The time period for the full combustion determination may be fixed or varied according to the remaining charge BRM or the temperature Tb of the battery 194 or the integrated amount of electric power WP taken out of the battery 194. For convenience of explanation, the various methods of determining the time period for the full combustion determination are described separately. It is, however, practical to determine the comprehensive specification of the hybrid vehicle as the combination of these methods.

By way of example, it is practical to determine the time period for the full combustion determination comprehensively by combining the results of plural decisions separately carried out:

(1) whether or not the integrated amount of electric power WP taken out of the battery 194 has reached or exceeded the upper limit WPmax as described in the third embodiment:

(2) whether or not the time period Ts since the start of the starting control has reached or exceeded the limit value Tmax as described in the first embodiment;

(3) whether or not the driver operates the starter switch 179; and (4) whether or not the battery 194 is not under the condition of an abrupt decrease in output voltage, an excessive increase in output electric current, or an excessive decrease in remaining charge BRM.

After the end of the preset time period for the full combustion determination, the supply of electricity to the first motor MG1 is stopped. The preset time period for the full combustion determination accordingly protects the battery 194. In the above example, the higher priority may be given in the reverse sequence, that is, (4)–(3)–(2)–(1). This gives the first priority to the protection of the battery 194 and the next priority to the requirement of the driver. The battery 194 in the hybrid vehicle is occasionally used as the energy source for driving and thereby has the high density and high performance. The lowered performance of the battery 194 thus directly affects the driving performance of the vehicle. A high cost is required for the replacement of the battery 194. It is accordingly desirable to give the first priority to the protection of the battery 194. In the case where the hybrid vehicle has another battery specifically used for starting, the first priority may be given to the requirement of the driver.

The sequence of priority may be varied according to a variety of conditions. The battery 194 stores the electrical energy in a chemical form, so that the properties of the battery 194 are significantly affected by the temperature. Another preferable structure accordingly changes the sequence of priority based on the temperature Tb of the battery 194. By way of example, when the temperature Tb of the battery 194 is not higher than −10° C., the time period for the full combustion determination is set while the first priority is given to the protection of the battery 194. When the temperature Tb exceeds −10° C., the control procedure determines that the battery 194 has the sufficient electric power and preferentially shortens the time of starting control. When the temperature Tb exceeds −10° C., a higher value is set to the cranking torque STG, in order to increase the revolving speed of the engine 150 quickly. In this case, the time period Tmax for the full combustion determination can be shortened.

In the above embodiments, when the engine 150 has not fallen into the state of full combustion within the preset time, it is determined that there is some abnormality of the engine 150 (for example, step S360 in the flowchart of FIG. 13). When the engine 150 is extreme cold, the low viscosity of the lubricant and the significantly low startability may prevent the engine 150 from falling into the state of full combustion by the one cycle of starting control. In this case, it is not practical to determine the abnormal state of the engine 150 immediately. In the actual procedure, the abnormal state of the engine 150 is thus determined when plural cycles of starting control still fail to make the engine 150 in the state of full combustion. Another possible application sets the number of cycles of starting control before determination of the abnormality of the engine 150 based on the cooling water temperature Tw of the engine 150. When the revolving speed of the engine 150 does not increase at all or is lower than a preset lower limit, the type of possible abnormality may be burn-out of the engine 150. When the revolving speed of the engine 150 shows an abnormal increase ratio, the type of possible abnormality may be a damage of the crankshaft 156.

In the structure that computes the integrated amount of electric power WP in the starting control operation as described in the third embodiment, when the integrated amount of electric power WP shows a significant drop of the remaining charge BRM of the battery 194, the type of possible abnormality may be abnormality of the battery 194.

The structure and the functions of the starting control apparatus for the internal combustion engine are described above according to the variety of conditions. The process of determining the target torque STG of the first motor MG1 is described in detail with the flowchart of FIG. 5. The control procedure of the first motor MG1 to attain the output of the target torque STG from the first motor MG1 has, however, not been specifically described in the above embodiments. The following describes the control procedure of the first motor MG1. Control of the first motor MG1 implies control of the electric currents flowing through the three-phase coils 134. After setting the target drive torque STG of the first motor MG1, the controller 180 calculates target electric currents Id1* and Iq1* of the first motor MG1 from the target drive torque STG and then computes voltages Vu1, Vv1, and Vw1 applied to the three-phase coils 134 of the first motor MG1 at step S50 in the flowchart of FIG. 4.

Figure 23:
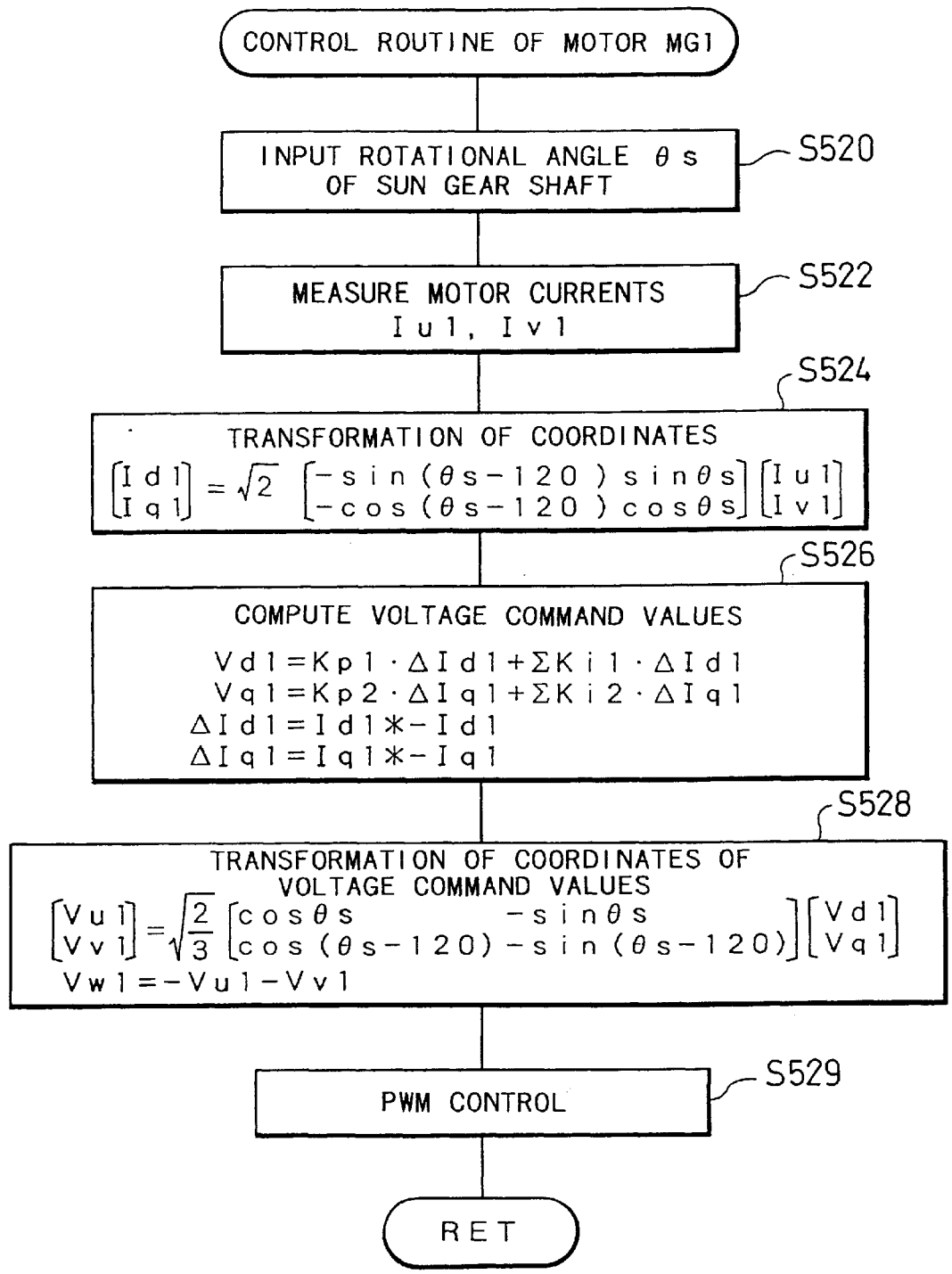
FIG. 23 is a flowchart showing the details of the processing for controlling operation of the first motor MG1 at step S50 in the flowchart of FIG. 4.

The control of the first motor MG1 follows a control routine of the first motor MG1 shown in the flowchart of FIG. 23. When the program enters the control routine of FIG. 23, the control CPU 190 first reads the rotational angle θs of the sun gear shaft 125 detected by the resolver 139 at step S520, and detects values of currents Iu1 and Iv1 flowing through the U phase and V phase of the three-phase coils 134 in the first motor MG1 with the ammeters 195 and 196 at step S522. Although the currents naturally flow through all the three phases U, V, and W, measurement is required only for the currents passing through the two phases since the sum of the currents is equal to zero. At subsequent step S524, the control CPU 190 executes transformation of coordinates (three-phase to two-phase transformation) using the values of currents flowing through the three phases obtained at step S522. The transformation of coordinates maps the values of currents flowing through the three phases to the values of currents passing through d and q axes in the permanent magnet-type synchronous motor and is executed according to Equation (1) given below. The transformation of coordinates is carried out because the currents flowing through the d and q axes are essential for the torque control in the permanent magnet-type synchronous motor. Alternatively, the torque control may be executed directly with the currents flowing through the three phases.

$$\begin{bmatrix} Id1 \\ Iq1 \end{bmatrix} = \sqrt{2} \begin{bmatrix} -\sin(\theta s - 120) & \sin\theta s \\ -\cos(\theta s - 120) & \cos\theta s \end{bmatrix} \begin{bmatrix} Iu1 \\ Iv1 \end{bmatrix} \quad (1)$$

After the transformation to the currents of two axes, the control CPU 190 computes deviations of currents Id1 and Iq1 actually flowing through the d and q axes from current command values Id1* and Iq1* of the respective axes, which are calculated from the target drive torque STG of the first motor MG1, and subsequently determines voltage command values Vd1 and Vq1 with respect to the d and q axes at step S526. In accordance with a concrete procedure, the control CPU 190 executes arithmetic operations of Equations (2) and Equations (3) given below. In Equations (3), Kp1, Kp2, Ki1, and Ki2 represent coefficients, which are adjusted to be suited to the characteristics of the motor applied. Each voltage command value Vd1 (Vq1) includes a part in proportion to the deviation ΔI from the current command value I* (the first term on the right side of Equation (3)) and a summation of historical data of the deviations ΔI for 'i' times (the second term on the right side).

$$\Delta Id1 = Id1^* - Id1 \qquad (2)$$
$$\Delta Iq1 = Id1^* - Iq1$$

$$Vd1 = Kp1 \cdot \Delta Id1 + \sum Ki1 \cdot \Delta Id1 \qquad (3)$$
$$Vq1 = Kp2 \cdot \Delta Iq1 + \sum Ki2 \cdot \Delta Iq1$$

The control CPU 190 then re-transforms the coordinates of the voltage command values thus obtained (two-phase to three-phase transformation) at step S528. This corresponds to an inverse of the transformation executed at step S524. The inverse transformation determines voltages Vu1, Vv1, and Vw1 actually applied to the three-phase coils 134 as expressed by Equations (4) given below:

$$\begin{bmatrix} Vu1 \\ Vv1 \end{bmatrix} = \sqrt{\frac{2}{3}} \begin{bmatrix} \cos\theta s & -\sin\theta s \\ \cos(\theta s - 120) & -\sin(\theta s - 120) \end{bmatrix} \begin{bmatrix} Vd1 \\ Vq1 \end{bmatrix} \qquad (4)$$
$$Vw1 = -Vu1 - Vv1$$

The actual voltage control is accomplished by on-off operation of the transistors Tr1 through Tr6 in the first driving circuit 191. At step S529, the on- and off-time of the transistors Tr1 through Tr6 in the first driving circuit 191 is PWM (pulse width modulation) controlled, in order to attain the voltage command values Vu1, Vv1, and Vw1 determined by Equations (4) given above.

The control of the second motor MG2 is fundamentally identical with the control of the first motor MG1 shown in the flowchart of FIG. 23 and is thus not specifically described here. The difference from the control of the first motor is that the target torque in the control of the second motor MG2 is the sum of the torque to be output to the drive shaft 112 (which is equal to zero when the vehicle is at a stop) and the counter force of the cranking torque by the first motor MG1.

Figure 24:
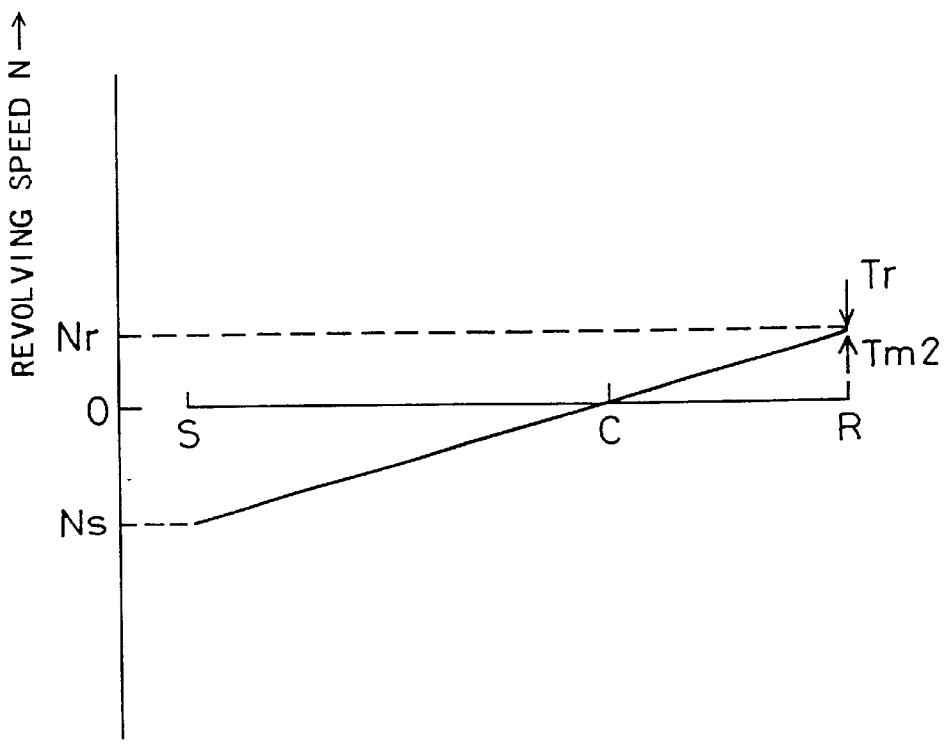
FIG. 24 is a nomogram showing the state in which the engine 150 is at a stop and the vehicle is driven only by the power output from the second motor MG2.
Figure 25:
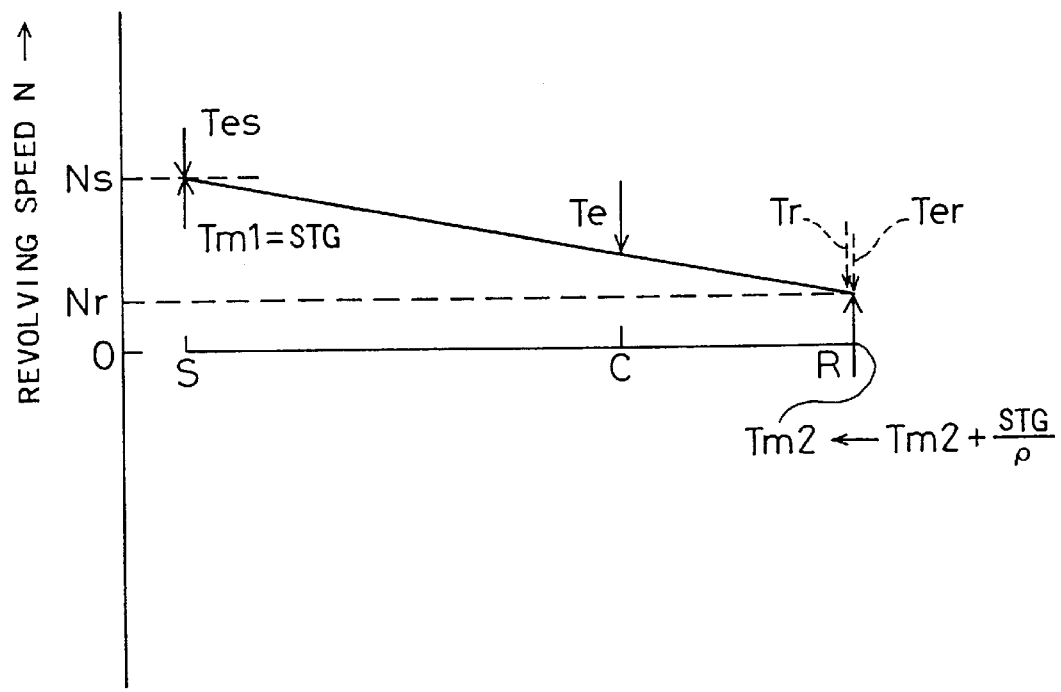
FIG. 25 is a nomogram showing the state in which the engine 150 is being motored by the first motor MG1 while the vehicle is driven only by the power output from the second motor MG2.

FIGS. 24 and 25 are nomograms showing a variation when the engine 150 is motored by the first motor MG1. The nomogram of FIG. 24 shows the state in which the engine 150 is at a stop and the vehicle is driven only by the power output from the second motor MG2. The nomogram of FIG. 25 shows the state in which the engine 150 is motored by the first motor MG1. In the state of FIG. 23, while the engine 150 is at a stop, the second motor MG2 outputs a torque Tm2 to the ring gear shaft 126 to drive the vehicle. In this state, the sun gear shaft 125 is rotated to revolve the rotor 132 of the first motor MG1. The torque of the first motor MG1 is, however, equal to zero, so that the first motor MG1 is neither in the regenerative operation nor in the power operation.

When the starting control operation is performed in this state, the first motor MG1 outputs the drive torque corresponding to the target torque STG to the sun gear shaft 125, and the second motor MG2 outputs the sum of the drive torque Tm2 and an additional value STG/ρ to the ring gear shaft 126. The value ρ denotes the ratio of the number of teeth of the sun gear 121 to the number of teeth of the ring gear 122 in the planetary gear 120 and expressed by Equation (5) given below:

$$\rho = \frac{\text{Number of teeth of sun gear}}{\text{Number of teeth of ring gear}} \qquad (5)$$

Application of the torque to the sun gear shaft 125 breaks the balance shown in FIG. 24 and thereby causes the crankshaft 156 of the engine 150 to start rotation. The revolving speed of the crankshaft 156 continues increasing until a torque Tm1 (=target torque STG) output from the first motor MG1 to the sun gear shaft 125 balances a division (torque Tes) of a resistance (torque Te) to the sun gear shaft 125. The resistance (torque Te) against the rotation of the engine 150 includes the sliding friction of the piston 155 and the compressive work of the engine 150. A division (torque Ter) of the resistance (torque Te) to the ring gear shaft 126 balances an increase (STG/ρ) in torque Tm2 of the second motor MG2, so that the torque output to the ring gear shaft 126 has no change.

The respective elements of the power output apparatus 110 used as the starting control apparatus of the present invention may have a variety of configurations other than those described above. For example, permanent magnets (PM)-type synchronous motors are used as the first motor MG1 and the second motor MG2 in the embodiments discussed above. Any other motors which can implement both the regenerative operation and the power operation, such as variable reluctance (VR)-type synchronous motors, vernier motors, d.c. motors, induction motors, superconducting motors, and stepping motors, may, however, be used according to the requirements.

Transistor inverters are used as the first and the second driving circuits 191 and 192 in the above embodiments. Other available examples include IGBT (insulated gate bipolar mode transistor) inverters, thyristor inverters, voltage PWM (pulse width modulation) inverters, square-wave inverters (voltage inverters and current inverters), and resonance inverters.

The battery 194 may consist of Pb cells, NiMH cells, Li cells, or any like cells. A capacitor may be used in place of the battery 194.

Figure 26:
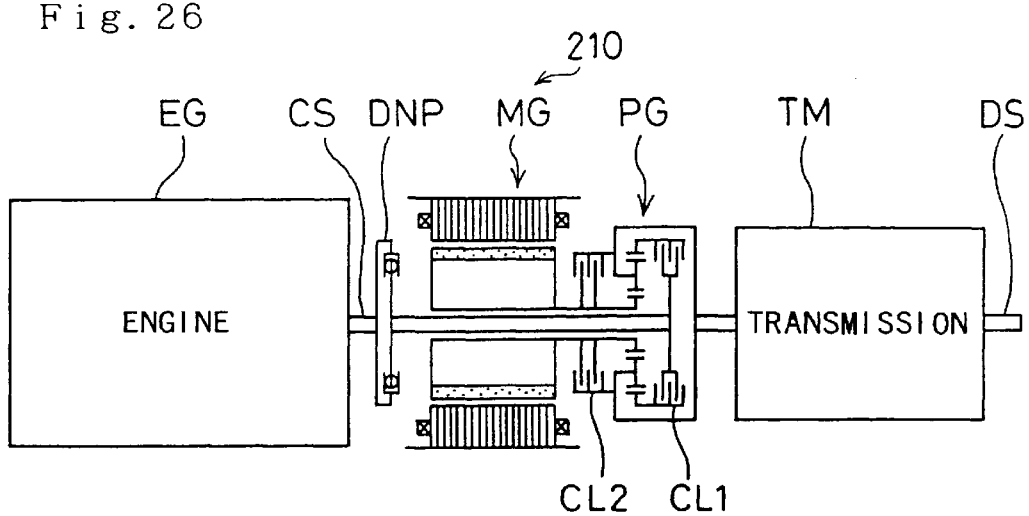
FIG. 26 schematically illustrates the structure of another power output apparatus 210 connected to the engine 150.
Figure 27:
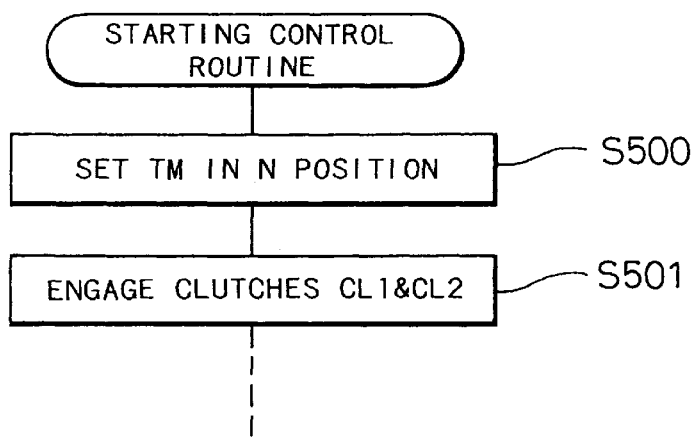
FIG. 27 is a flowchart showing part of the starting control routine executed by the power output apparatus 210.

In the above embodiments, the crankshaft 156 of the engine 150 is linked with the planetary gear 120, the first motor MG1, and the second motor MG2 via the damper 157 and the carrier shaft 127, and the first motor MG1 motors the crankshaft 156 of the engine 150. One possible modification is a power output apparatus 210 shown in FIG. 26. In the power output apparatus 210, while a transmission TM is set in a neutral position, a clutch CL1 and a clutch CL2 attached to a planetary gear PG are engaged. A crankshaft CS of an engine EG is accordingly connected to a motor MG via a damper DNP and the planetary gear PG, in order to be motored by the motor MG. In this power output apparatus 210, a process of changing the transmission TM to the neutral position (step S500) and a process of engaging the clutches CL1 and CL2 (step S501) shown in FIG. 27 are carried out, prior to the starting control routine in the flowchart of FIG. 4. The subsequent processing is fundamentally identical with that shown in the flowchart of FIG. 4.

Figure 28:
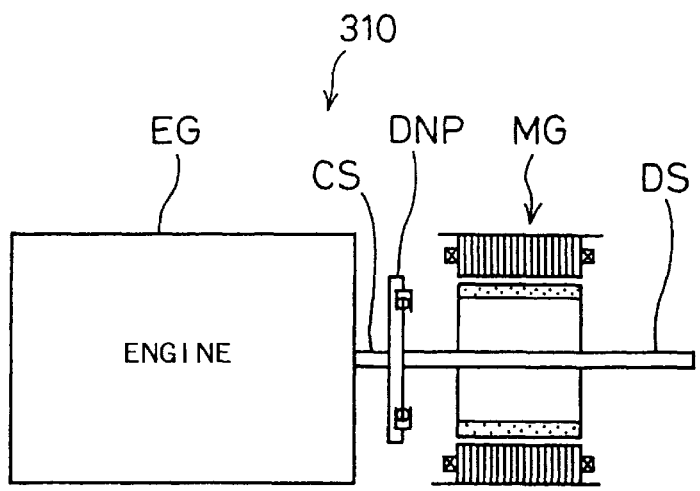
FIG. 28 schematically illustrates the structure of still another power output apparatus 310 connected to the engine 150.

The principle of the present invention is applicable to any structure that causes a motor to drive a crankshaft of an engine. For example, the present invention is applicable to another power output apparatus 310 shown in FIG. 28, where the crankshaft CS of the engine EG is connected with the motor MG only via the damper DNP.

The present invention is not restricted to the above embodiments or their modifications, but there may be many other modifications, changes, and alterations without departing from the scope or spirit of the main characteristics of the present invention. For example, the starting control apparatus for the internal combustion engine may be mounted on other transportation means like ships and airplanes as well as a variety of industrial machines.

What is claimed is:

1. In a hybrid vehicle having an internal combustion engine, which is connected via a damper with a rotating shaft of a motor driven by a battery, a starting control apparatus that starts said internal combustion engine with a positive torque of said motor, said starting control apparatus comprising:

a torque control unit that controls an output torque of said motor, based on a relationship between an output torque of said internal combustion engine and a torque required for said drive shaft;

a torque detection unit for detecting that the output torque of said motor has a negative value; and a supply of electricity limiting unit that causes said torque detection unit to carry out the determination while said motor cranks said internal combustion engine, and limits a supply of electricity from said battery to said motor when the output torque of said motor does not have a negative value.

2. The starting control apparatus in accordance with claim 1, said starting control apparatus further comprising: a time count unit for determining that a predetermined time period has elapsed since a start of cranking said internal combustion engine by said motor, wherein said supply of electricity limiting unit causes said torque detection unit to carry out the determination at a specific time point when said time count unit determines that the predetermined time period has elapsed, and cuts off a supply of electricity from said battery to said motor, so as to stop the cranking of said internal combustion engine, when the output torque of said motor does not have a negative value at the specific time point.

3. The starting control apparatus in accordance with claim 2, said starting control apparatus further comprising: a startability detection unit that detects a parameter relating to startability of said internal combustion engine; and a time period setting unit that sets a greater value to the predetermined time period, which is a target of the determination by said time count unit, in response to the lower startability of said internal combustion engine specified from the parameter.

4. The starting control apparatus in accordance with claim 2, said starting control apparatus further comprising:

an electric power estimation unit that estimates an amount of electric power suppliable from said battery; and a unit that sets a greater value to the predetermined time period, which is a target of the determination by said time count unit, for the greater amount of estimated electric power.

5. The starting control apparatus in accordance with claim 4, wherein said electric power estimation unit comprises a unit that measures a temperature of said battery and a unit that corrects the estimated value of suppliable electric power to a larger value at the higher battery temperature.

6. The starting control apparatus in accordance with claim 2, said starting control apparatus further comprising: an electric power integration unit that integrates electric power consumed by said battery since the start of cranking, wherein said time count unit determines that the predetermined time period has elapsed when the integrated electric power reaches a preset reference value.

7. The starting control apparatus in accordance with claim 6, said starting control apparatus further comprising: a battery temperature measuring unit that measures a temperature of said battery; and a unit that corrects the preset reference value, which is used for the determination by said time count unit, to a smaller value at the lower battery temperature measured by said battery temperature measuring unit.

8. The starting control apparatus in accordance with claim 1, said starting control apparatus further comprising: a unit that adjusts an open-close timing of an air intake valve of said internal combustion engine, in order to lower an effective compression ratio of said internal combustion engine, at a time of starting said internal combustion engine.

9. In a hybrid vehicle having an internal combustion engine, which is connected via a damper with a rotating shaft of a motor driven by a battery, a method of rotating said internal combustion engine with a positive torque of said motor so as to start said internal combustion engine with said motor, said method comprising the steps of:

controlling an output torque of said motor, based on a relationship between an output torque of said internal combustion engine and a torque required for said drive shaft;

detecting whether the output torque of said motor has a negative value while said motor cranks said internal combustion engine; and cutting off a supply of electricity from a battery to said motor based upon a determination that the output torque of said motor does not have a negative value.

10. A staffing control apparatus for a hybrid vehicle, which starts an internal combustion engine in a hybrid vehicle that takes out power of said internal combustion engine in an electrical form and outputs power of a motor at least to a drive shaft of said vehicle, said starting control apparatus comprising:

a motor that produces a positive torque to crank said internal combustion engine at a start of said internal combustion engine;

a starting-time fuel supply unit that controls a supply of fuel to said internal combustion engine, simultaneously with cranking of said internal combustion engine by said motor;

a torque control unit that controls an output torque of said motor, based on a relationship between an output torque of said internal combustion engine and a torque required for said drive shaft;

a torque detection unit for detecting that the output torque of said motor has a negative value; and an electricity cut-off unit that causes said torque detection unit to carry out the determination while said motor cranks said internal combustion engine, and cuts off a supply of electricity from a battery to said motor when the output torque of said motor does not have a negative value.

11. In a hybrid vehicle having an internal combustion engine, which is connected with a rotating shaft of a motor driven by a battery, a starting control apparatus that starts said internal combustion engine with a positive torque of said motor, said starting control apparatus comprising:

a torque control unit that controls an output torque of said motor, based on a relationship between an output torque of said internal combustion engine and a torque required for said drive shaft;

a torque detection unit for detecting that the output torque of said motor has a negative value; and a supply of electricity limiting unit that causes said torque detection unit to carry out the determination while said motor cranks said internal combustion engine, and limits a supply of electricity from said battery to said motor when the output torque of said motor does not have a negative value.

12. A starting control apparatus for an internal combustion engine that rotates said internal combustion engine, which is connected with a rotating shaft of a motor driven by a battery, with said motor so as to start said internal combustion engine, said starting control apparatus comprising:

a charging state detection means for detecting the charging state of said battery; and means for setting a limit value which is a maximum time period for which said motor continues cranking said internal combustion engine at the time of starting said internal combustion engine, based on the detected charging state.

13. The starting control apparatus in accordance with claim 12, wherein said charging state detection means detects the remaining amount of said battery and said means for setting a limit value sets the limit value to a smaller value, in response to a smaller remaining amount, based on the detected remaining amount.

14. A starting control apparatus for an internal combustion engine that rotates said internal combustion engine, which is connected with a rotating shaft of a motor driven by a battery, with said motor so as to start said internal combustion engine, said starting control apparatus comprising:

a means for detecting electric power consumed by said motor that is operated for the cranking of said internal combustion engine at the time of its start-up; and a restriction means for restricting the cranking by the motor at the time of the start-up, so that the integrated value of the power consumption will not exceed a predetermined upper limit.

* * * * *